(12) United States Patent
Lee et al.

(10) Patent No.: US 11,584,260 B2
(45) Date of Patent: *Feb. 21, 2023

(54) POWER SEAT OPERATING DEVICE HAVING SEESAW TYPE SWITCH FOR VEHICLE

(71) Applicants: HYUNDAI MOTOR COMPANY, Seoul (KR); KIA CORPORATION, Seoul (KR)

(72) Inventors: Baek Hee Lee, Suwon-si (KR); Keun Hui Kim, Uiwang-si (KR); Beom Young Oh, Anyang-si (KR); Hyuk Soo Kim, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,062

(22) Filed: Jun. 28, 2021

(65) Prior Publication Data
US 2022/0153171 A1      May 19, 2022

(30) Foreign Application Priority Data
Nov. 19, 2020   (KR) .......................... 10-2020-0155252

(51) Int. Cl.
*H01H 23/14*     (2006.01)
*B60N 2/02*      (2006.01)
(Continued)

(52) U.S. Cl.
CPC ............ *B60N 2/0228* (2013.01); *B60K 35/00* (2013.01); *B60N 2/12* (2013.01); *B60N 2/22* (2013.01);
(Continued)

(58) Field of Classification Search
CPC ...... H01H 3/125; H01H 13/705; H01H 13/14; H01H 13/04; H01H 13/10; H01H 13/70;
(Continued)

(56) References Cited

U.S. PATENT DOCUMENTS

| 5,668,357 A | * | 9/1997 | Takiguchi | ............ B60N 2/0228 |
| | | | | 200/302.1 |
| 2010/0193340 A1 | * | 8/2010 | Ujimoto | ............... B60N 2/0228 |
| | | | | 200/339 |

(Continued)

FOREIGN PATENT DOCUMENTS

JP        2009-269528 A      11/2009

*Primary Examiner* — Ahmed M Saeed
(74) *Attorney, Agent, or Firm* — Morgan, Lewis & Bockius LLP

(57) ABSTRACT

A power seat operating device for a vehicle has a switch module for operating a power seat of the vehicle. In particular, the switch module includes a plurality of seesaw type switches to control operation directions of the power seat, and the operation directions of the power seat according to the operation of each switch is displayed with arrows on a display, thereby improving the switch operating convenience of the user such as accurately controlling the operation direction of the power seat according to the switch operation by the user, and accurately recognizing a selection state and an operation direction of the switch desired by the user.

15 Claims, 26 Drawing Sheets

(51) Int. Cl.
| | |
|---|---|
| *B60K 35/00* | (2006.01) |
| *B60N 2/12* | (2006.01) |
| *B60N 2/22* | (2006.01) |
| *B60N 2/90* | (2018.01) |
| *B60N 2/66* | (2006.01) |
| *H01H 19/14* | (2006.01) |
| *H01H 25/06* | (2006.01) |

(52) U.S. Cl.
CPC ............ *B60N 2/6673* (2015.04); *B60N 2/99* (2018.02); *H01H 19/14* (2013.01); *H01H 23/143* (2013.01); *H01H 25/065* (2013.01); *B60K 2370/131* (2019.05); *B60K 2370/1446* (2019.05); *B60K 2370/152* (2019.05); *B60K 2370/162* (2019.05); *B60K 2370/171* (2019.05)

(58) Field of Classification Search
CPC ............ H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20; H01H 19/14; H01H 23/143; H01H 25/065; B60N 2/0228; B60N 2/12; B60N 2/22; B60N 2/6673; B60N 2/99; B60K 35/00; B60K 2370/131; B60K 2370/1446; B60K 2370/152; B60K 2370/162; B60K 2370/171

See application file for complete search history.

(56) References Cited

U.S. PATENT DOCUMENTS

2016/0193976 A1\* 7/2016 Wild ........................ G06F 3/044
　　　　　　　　　　　　　　　　　　　　701/36
2022/0144138 A1\* 5/2022 Lee ........................ H01H 25/04

\* cited by examiner

FIG. 23 "PRIOR ART"
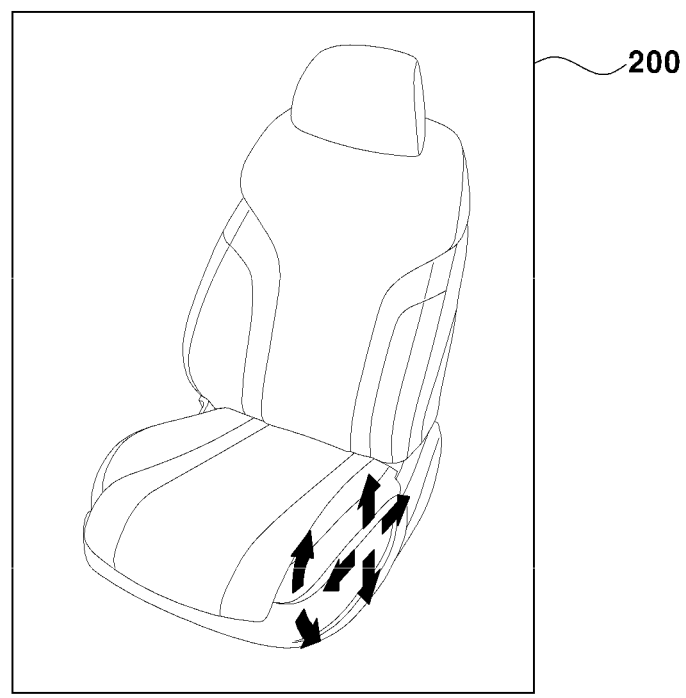

POWER SEAT OPERATING DEVICE HAVING SEESAW TYPE SWITCH FOR VEHICLE

CROSS-REFERENCE TO RELATED APPLICATION

This application claims priority to and the benefit of Korean Patent Application No. 10-2020-0155252, filed on Nov. 19, 2020, the entire contents of which are incorporated herein by reference.

FIELD

The present disclosure relates to a power seat operating device having a seesaw type switch for a vehicle.

BACKGROUND

The statements in this section merely provide background information related to the present disclosure and may not constitute prior art.

Generally, a power seat for a vehicle includes a seat cushion for seating, a seatback against which the back leans, and a headrest supporting a neck and a head, as an essential configuration, and additionally, further includes power mechanism configurations for adjusting various positions of a seat.

Particularly, the side portion of the power seat is mounted with a switch module for adjusting the seat cushion, the seatback, and the like to various locations.

The switch module adopts a structure in which several switches are combined and arranged for the forward and backward movement adjustment in the seat, the height adjustment in the seat cushion, the extension adjustment for the front portion of the seat cushion, the bolster angle adjustment in the seatback, the reclining adjustment in the seatback, the support direction adjustment in a lumbar support installed within the seatback, and the like.

Further, a touch sensor is embedded in each switch of the switch module, such that the selection state and operating direction of the switch may be displayed through a display around a driver seat together with the sensing operation of the touch sensor when the user's hand touches the switch.

Therefore, the user may easily, visually recognize the selection state and the operation direction of the switch displayed on the display while keeping an eye on the front during driving.

That is, the user may easily, visually recognize the selection state and the operation direction of the switch displayed on the display, thereby eliminating the user's inconvenience such as turning the head toward the switch module while bending the upper body for directly confirming the operating state of the switch module mounted on the side portion of the seat.

Meanwhile, the switch module may be composed of a first switch for the adjustment in a total of six directions such as the forward and backward movement adjustment in the entire seat (two directions), the up and down of the front portion of the seat cushion (two directions), and the vertical height adjustment in the seat cushion (two directions), a second switch for the extension adjustment for the front portion of the seat cushion (two directions), a third switch for the reclining adjustment in the seatback (two directions), a fourth switch for the bolster angle adjustment in the seatback (two directions), a fifth switch for the support direction adjustment in the lumbar support (four directions), and the like.

Further, touch sensors may be embedded in the first to fifth switches.

Therefore, when the touch operation is performed in which the user's hand touches the surface of one switch of the first to fifth switches desired by the user to operate, a sensing signal of the touch sensor embedded in the corresponding switch is output to a controller, and subsequently, the arrow indicating the operation direction of the power seat according to the operating of the switch touched by the user's hand may be displayed on the display by the control of the controller.

Therefore, the operation direction of the power seat according to the operating of the switch touched by the user's hand may be displayed on the display, such that the user may visually, easily recognize the operation direction of the power seat according to the switch operating.

For example, when the touch operation is performed in which the user's hand touches the first switch for the adjustment in a total of six directions such as the forward and backward movement adjustment in the seat (two directions), the up and down of the front portion of the seat cushion (two directions), and the height adjustment in the seat cushion (two directions), as illustrated in FIG. 23, a total of six arrows guiding the operation direction of the power seat according to the operating of the first switch are simultaneously displayed on a display 200 together with the sensing operation of the touch sensor embedded in the first switch, such that the user may visually, easily recognize that the first switch is being selected.

However, we have discovered that even if the user touches any portion of the first switch, a total of six arrows guiding the operation direction of the power seat by the operating of the first switch are simultaneously displayed on the display, such that there is a disadvantage in that the user does not accurately receive the guidance for the operation direction of the first switch and the operation direction of the power seat actually desired by the user.

Likewise, even in the case of the second switch to the fifth switch, even if the user touches any portion of the second to fifth switches, all operation directions of the power seat according to the operating of the second to fifth switches are simultaneously displayed on the display by the arrows, such that there is a disadvantage in that the user does not accurately receive the guidance for the operation directions of the second to fifth switches and the operation direction of the power seat actually desired by the user.

For example, even if the touch operation is performed in which the user's hand touches the surface of the rear end of the first switch for the forward movement adjustment (e.g., pushing the first switch forward) of the seat, a total of six arrows guiding the operation direction of the power seat according to the operating of the first switch are simultaneously displayed on a display, such that the user may recognize that his/her hand touches the first switch, but there is a disadvantage in that the user does not accurately receive the guidance for the operation direction of the first switch for the forward movement adjustment in the seat and the operation direction of the power seat (e.g., the forward movement adjustment in the seat) according to the operating of the first switch.

That is, if the touch operation is performed in which the user's hand touches the surface of the rear end of the first switch for the forward movement adjustment (e.g., operating of pushing the first switch forward) of the seat, the user may accurately recognize the operation direction of the first switch for the forward movement adjustment in the seat when only one arrow guiding the forward movement adjustment in the seat is displayed on the display, but as described above, a total of six arrows guiding all operation directions of the power seat which may be operated by the operating of the first switch are simultaneously displayed on the display, such that there is a problem in that the user does not accurately receive the guidance for the operation direction of the first switch desired by the user, thereby rather increasing the inconvenience when the user handles the switch.

The above information disclosed in this Background section is only for enhancement of understanding of the background of the disclosure and accordingly it may contain information that does not form the prior art that is already known to a person of ordinary skill in the art.

SUMMARY

The present disclosure provides a power seat operating device having a seesaw type switch for a vehicle, which may embed a plurality of touch sensors for guiding each operation direction of a power seat for each seesaw type switch of a switch module for operating the power seat such that one arrow guiding the operation direction of the power seat according to the sensing operation of each touch sensor is displayed on a display, thereby improving the convenience of the switch operating of the user, such as accurately guiding the operation direction of the power seat according to the operating of the switch to the user, and accurately recognizing the selection state and operation direction of the switch desired by the user.

In one form of the present disclosure, a power seat operating device for a vehicle includes: a switch module including a plurality of seesaw type switches operating an input and configured to adjust a power seat to a desired location in a desired direction; a plurality of touch sensors embedded in each seesaw type switch of the plurality of seesaw type switches and configured to each generate a sensing signal corresponding to an operation direction of the power seat when touched by a user; a main controller determining the operation direction of the power seat, according to a sensing signal of the touch sensor of the plurality of touch sensors, which performs the sensing operation by the touch; and a display displaying the operation direction of the power seat determined by the main controller by one arrow to visually guide the operation direction of the power seat to the user.

The switch module may be provided in a structure in which a seesaw type first switch for operating the forward and backward movement operation of a seat, a second seesaw type switch for operating the vertical height adjustment operation of the seat, a third seesaw type switch for operating the front portion up and down operation of a seat cushion, a seesaw type fourth switch for operating the extension operation for the front portion of the seat cushion, and a seesaw type fifth switch for operating the reclining operation of a seatback, a push button type sixth switch for operating the support direction adjustment operation of a lumbar support, and a rotary knob type seventh switch for operating the bolster angle adjustment operation of the seatback are disposed in a predetermined arrangement.

The seesaw type first switch is composed of a first switch cover; a 1-1st touch sensor and a 1-2nd touch sensor spaced apart from each other and attached to the bottom surface portion of the first switch cover; a first moving block mounted on the bottom surface portion of the first switch cover; a 1-1st plunger and a 1-2nd plunger connected to the bottom portions of both sides of the first moving block to press a tact switch mounted on the main controller; a 1-1st conductive spring connecting between the 1-1st touch sensor and the main controller; and a 1-2nd conductive spring connecting between the 1-2nd touch sensor and the main controller.

In one form, both side ends of the first switch cover are formed with a 1-1st electrode exposure hole and a 1-2nd electrode exposure hole, respectively, a 1-1st electrode inserted into the 1-1st electrode exposure hole and exposed to the outside is formed to protrude from the 1-1st touch sensor, and a 1-2nd electrode inserted into the 1-2nd electrode exposure hole and exposed to the outside is formed to protrude from the 1-2nd touch sensor.

The seesaw type second switch is composed of a second switch cover; a 2-1st touch sensor and a 2-2nd touch sensor spaced apart from each other and attached to the bottom surface portion of the second switch cover; a second moving block mounted on the bottom surface portion of the second switch cover; a 2-1st plunger and a 2-2nd plunger connected to the bottom portions of both sides of the second moving block to press a tact switch mounted on the main controller; a 2-1st conductive spring connecting between the 2-1st touch sensor and the main controller; and a 2-2nd conductive spring connecting between the 2-2nd touch sensor and the main controller.

In another form, both side ends of the second switch cover are formed with a 2-1st electrode exposure hole and a 2-2nd electrode exposure hole, respectively, a 2-1st electrode inserted into the 2-1st electrode exposure hole and exposed to the outside is formed to protrude from the 2-1st touch sensor, and a 2-2nd electrode inserted into the 2-2nd electrode exposure hole and exposed to the outside is formed to protrude from the 2-2nd touch sensor.

The seesaw type third switch is composed of a third switch cover; a 3-1st touch sensor and a 3-2nd touch sensor spaced apart from each other and attached to the bottom surface portion of the third switch cover; a third moving block mounted on the bottom surface portion of the third switch cover; a 3-1st plunger and a 3-2nd plunger connected to the bottom portions of both sides of the third moving block to press a tact switch mounted on the main controller; a 3-1st conductive spring connecting between the 3-1st touch sensor and the main controller; and a 3-2nd conductive spring connecting between the 3-2nd touch sensor and the main controller.

In one form, both side ends of the third switch cover are formed with a 3-1st electrode exposure hole and a 3-2nd electrode exposure hole, respectively, a 3-1st electrode inserted into the 3-1st electrode exposure hole and exposed to the outside is formed to protrude from the 3-1st touch sensor, and a 3-2nd electrode inserted into the 3-2nd electrode exposure hole and exposed to the outside is formed to protrude from the 3-2nd touch sensor.

The seesaw type fourth switch is composed of a fourth switch cover; a 4-1st touch sensor and a 4-2nd touch sensor spaced apart from each other and attached to the bottom surface portion of the fourth switch cover; a fourth moving block mounted on the bottom surface portion of the fourth switch cover; a 4-1st plunger and a 4-2nd plunger connected to the bottom portions of both sides of the fourth moving block to press a tact switch mounted on the main controller; a 4-1st conductive spring connecting between the 4-1st touch sensor and the main controller; and a 4-2nd conductive spring connecting between the 4-2nd touch sensor and the main controller.

In one form, both side ends of the fourth switch cover are formed with a 4-1st electrode exposure hole and a 4-2nd electrode exposure hole, respectively, a 4-1st electrode inserted into the 4-1st electrode exposure hole and exposed to the outside is formed to protrude from the 4-1st touch sensor, and a 4-2nd electrode inserted into the 4-2nd electrode exposure hole and exposed to the outside is formed to protrude from the 4-2nd touch sensor.

The seesaw type fifth switch is composed of a fifth switch cover; a 5-1st touch sensor and a 5-2nd touch sensor spaced apart from each other and attached to the bottom surface portion of the fifth switch cover; a fifth moving block mounted on the bottom surface portion of the fifth switch cover; a 5-1st plunger and a 5-2nd plunger connected to the bottom portions of both sides of the fifth moving block to press a tact switch mounted on the main controller; a 5-1st conductive spring connecting between the 5-1st touch sensor and the main controller; and a 5-2nd conductive spring connecting between the 5-2nd touch sensor and the main controller.

In one form, both side ends of the fifth switch cover are formed with a 5-1st electrode exposure hole and a 5-2nd electrode exposure hole, respectively, a 5-1st electrode inserted into the 5-1st electrode exposure hole and exposed to the outside is formed to protrude from the 5-1st touch sensor, and a 5-2nd electrode inserted into the 5-2nd electrode exposure hole and exposed to the outside is formed to protrude from the 5-2nd touch sensor.

The push button type sixth switch is composed of a sixth switch cover partitioned into the forward protrusion operating region of the lumbar support, the backward contraction operating region thereof, the ascending operating region thereof, and the descending operating region thereof; a 6-1st touch sensor embedded in the forward protrusion operating region of the lumbar support of the sixth switch cover and connected to the main controller such that a signal may be output; a 6-2nd touch sensor embedded in the backward contraction operating region of the lumbar support of the sixth switch cover and connected to the main controller such that a signal may be output; a 6-3rd touch sensor embedded in the ascending operating region of the lumbar support of the sixth switch cover and connected to the main controller such that a signal may be output; and a 6-4th touch sensor embedded in the descending operating region of the lumbar support of the sixth switch cover and connected to the main controller such that a signal may be output.

In one form, an integrated signal output path of the 6-1st touch sensor, the 6-2nd touch sensor, the 6-3rd touch sensor, and the 6-4th touch sensor is connected to the main controller by a flexible cable such that a signal may be transmitted.

The rotary knob type seventh switch is composed of a seventh switch cover mounted on a predetermined location of the circumferential portion of the sixth switch; a 7-1st touch sensor embedded in a garnish plate adjacent to one side surface of the seventh switch cover and connected to the main controller such that a signal may be output; and a 7-2nd touch sensor embedded in a garnish plate adjacent to the other side surface of the seventh switch cover and connected to the main controller such that a signal may be output.

In another form, the 7-1st touch sensor and the 7-2nd touch sensor are connected to the main controller by a conductive spring such that a signal may be transmitted.

Through the above configuration, the present disclosure provides the following effects.

First, by embedding the plurality of touch sensors for each seesaw type switch of the switch module for operating the power seat such that the arrow guiding the operation direction of the power seat and the operation direction of the switch according to the sensing operation of each touch sensor is accurately displayed on the display, the user may accurately recognize the operation direction of the switch for operating the power seat to the desired position and the operation direction of the power seat according to the switch operating.

Second, the user may accurately recognize the switch selection state and the switch operation direction, and the operation direction of the power seat according to the switch operating while watching the seat and arrow images displayed on the display, thereby improving the switch operating convenience of the user.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 22A:
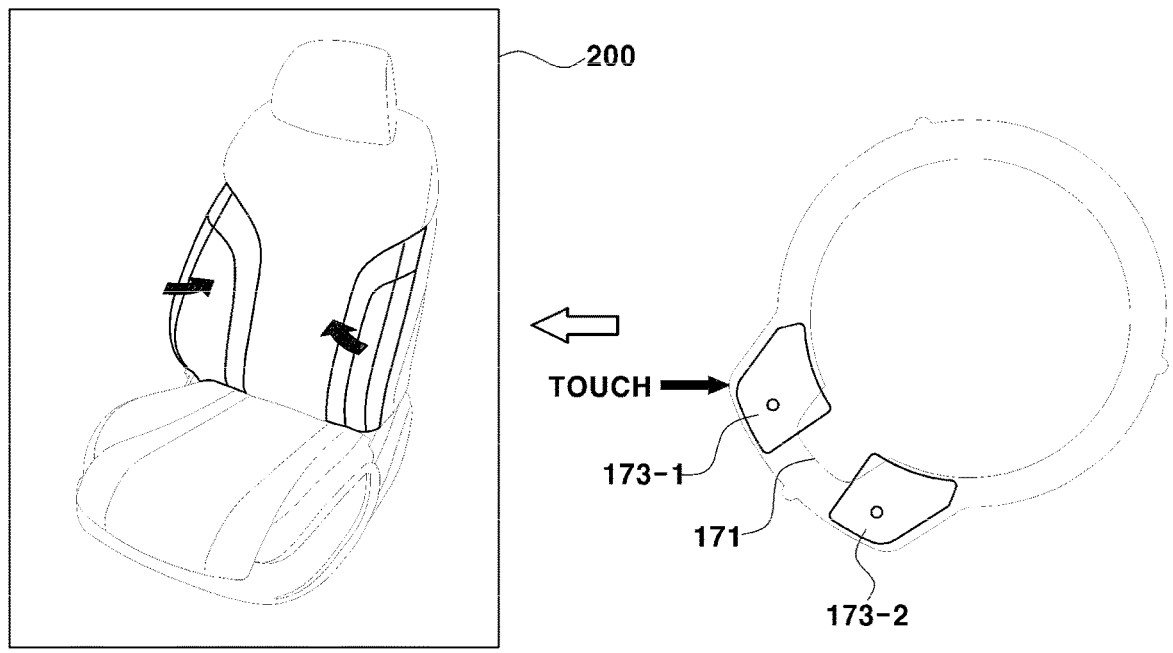
Figure 22B:
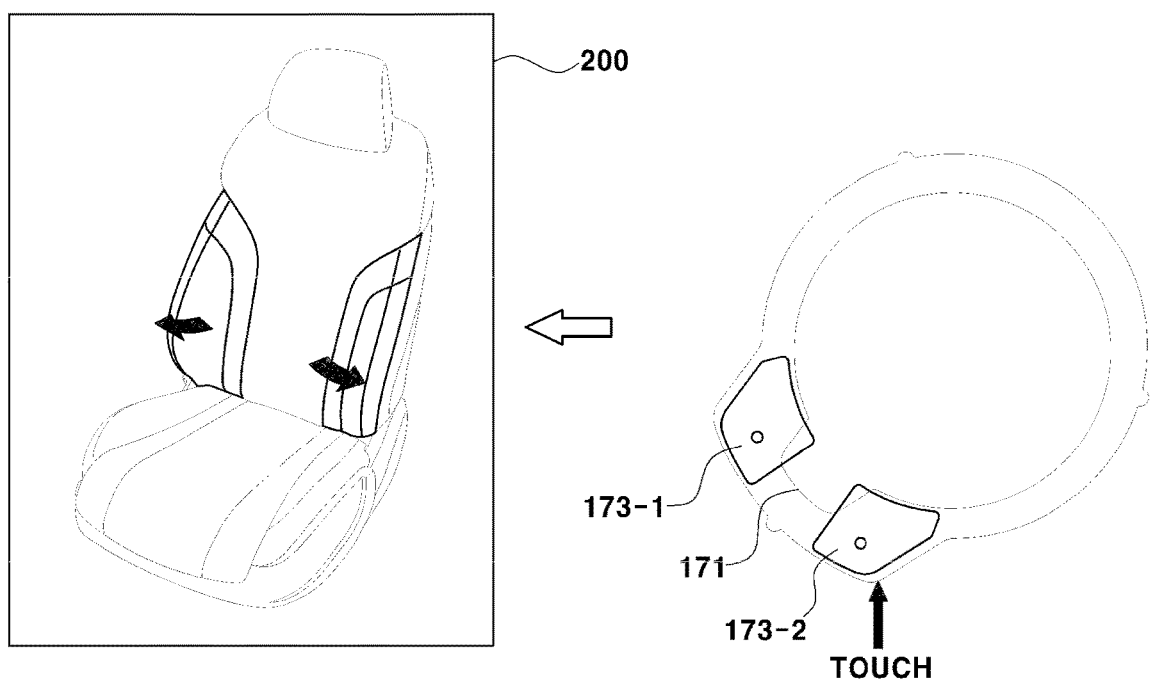

FIGS. 22A and 22B are diagrams illustrating that images guiding the operation direction of the power seat are differently displayed on a display according to the sensing of the touch sensor embedded in the seventh switch according to one form of the present disclosure; and FIG. 23 is a schematic diagram illustrating an example in which images guiding the operation direction of the conventional power seat are displayed on the display.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

Figure 1:
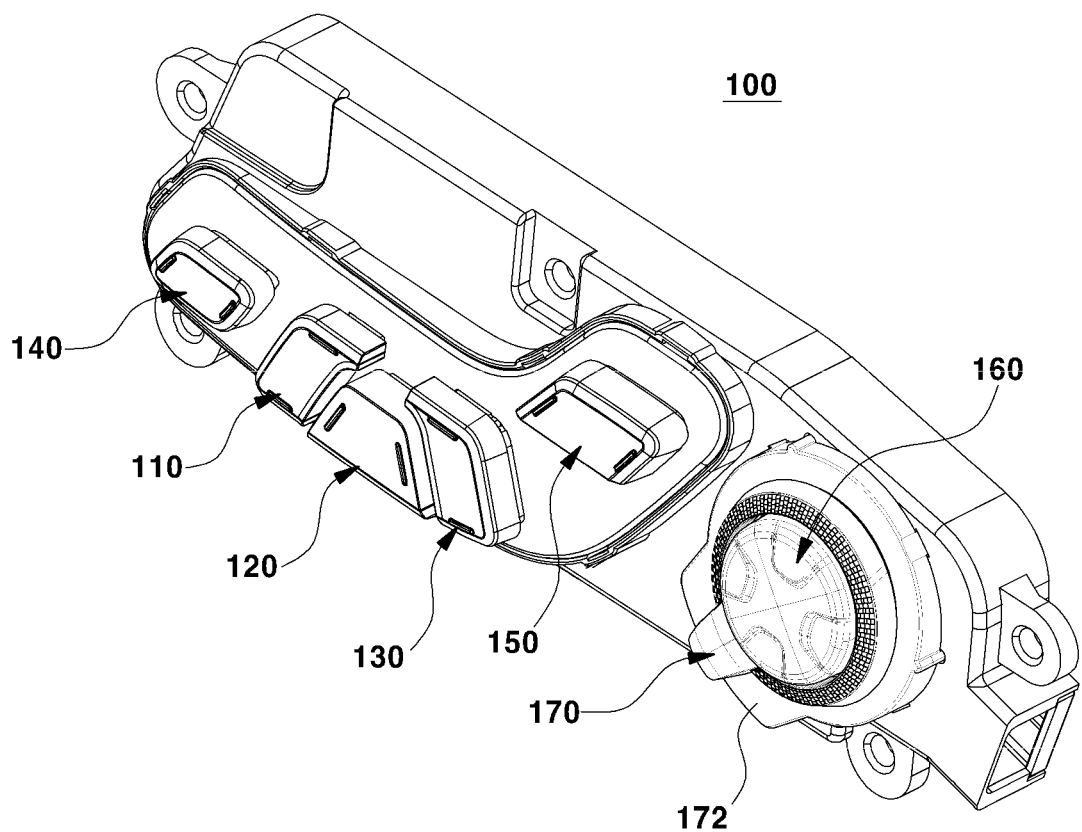
FIG. 1 is a perspective diagram illustrating a switch module of a power seat operating device for a vehicle according to one form of the present disclosure.

Hereinafter, FIG. 1 illustrates a switch module of a power seat operating device for a vehicle according to one form of the present disclosure.

The side portion of a seat (e.g., one side portion of a seat cushion) is mounted with a switch module 100 including seesaw type first to seventh switches 110, 120, 130, 140, 150, 160, 170 for operating the operation of a power seat.

As illustrated in FIG. 1, the switch module 100 may be composed of a seesaw type first switch 110 for the forward and backward movement adjustment (two directions) of the entire seat, a second seesaw type switch 120 for the vertical height adjustment (two directions) of a seat cushion, a third seesaw type switch 130 for the front portion up and down adjustment (two directions) of the seat cushion, a seesaw type fourth switch 140 for the extension adjustment (two directions) for the front portion of the seat cushion, a seesaw type fifth switch 150 for the reclining adjustment (two directions) of a seatback, a push button type sixth switch 160 for the support direction adjustment (four directions) of a lumbar support, a rotary knob type seventh switch 170 for the bolster angle adjustment (two directions) of the seatback, and the like.

The seesaw type refers to a type in which one side end of the switch moves downward and the other side end thereof moves upward when the operating of selectively pressing one side end of both ends of the switch is performed, the push button type refers to a type of vertically pressing and operating the switch, and the rotary knob type refers to a type of rotating and operating the switch at a predetermined angle.

Particularly, a plurality of touch sensors for guiding each operation direction of the power seat are embedded in each of the first switch to the seventh switch 110, 120, 130, 140, 150, 160, 170 configuring the switch module 100.

When a sensing signal of the touch sensor in which the sensing operation is performed of the plurality of touch sensors is received in a main controller, the main controller determines the operation direction of the power seat and the operation direction of the switch according to the sensing signal of the corresponding touch sensor, and then transmits a control signal for the display on a display.

Therefore, a seat image may be displayed on the display and one or more arrow images guiding the operation direction of the power seat and the operation direction of the switch determined by the main controller may be displayed.

Therefore, the user may accurately recognize the switch selection state and the switch operation direction, and the operation direction of the power seat according to the switch operating while watching the seat and arrow images displayed on the display, thereby improving the switch operating convenience of the user.

Figure 2:
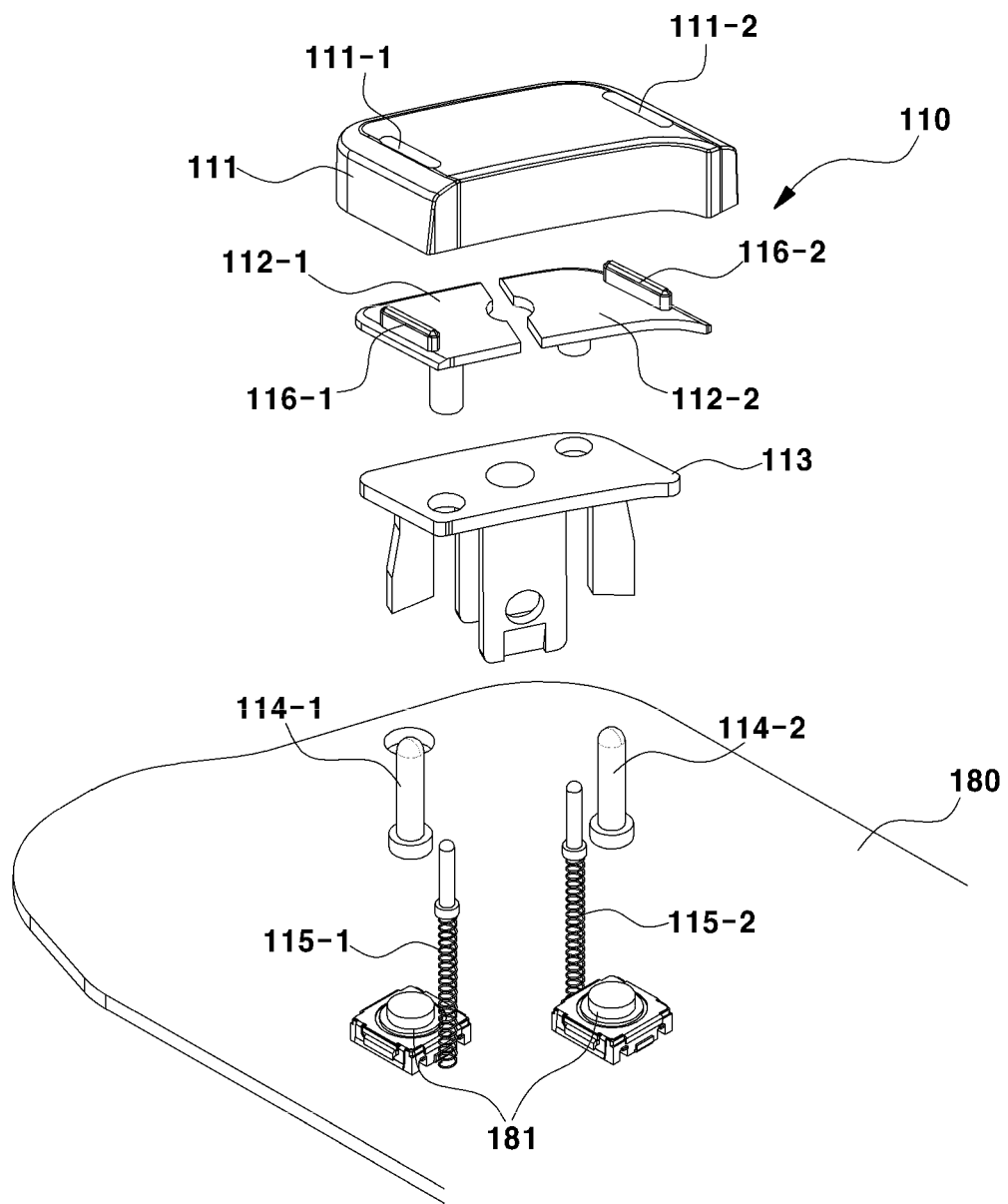
FIG. 2 is an exploded perspective diagram illustrating a first switch of the switch module according to one form of the present disclosure.
Figure 3:
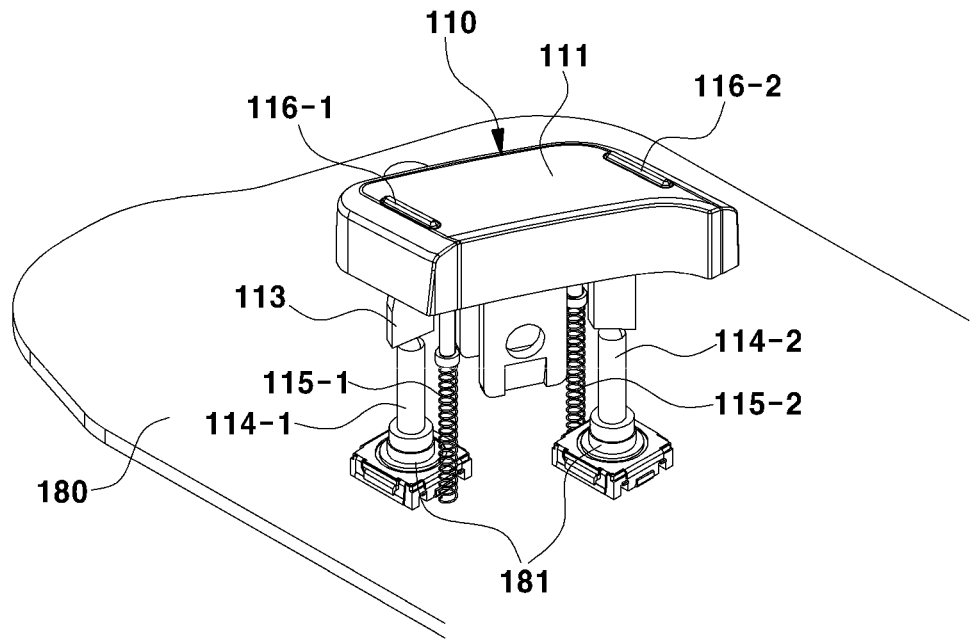
FIG. 3 is an assembling perspective diagram illustrating the first switch of the switch module according to one form of the present disclosure.

FIGS. 2 and 3 are diagrams illustrating a first switch of the switch module according to another form of the present disclosure, and a reference numeral 110 indicates the seesaw type first switch.

The seesaw type first switch 110 is configured for the forward and backward movement operating of the seat, and includes a first switch cover 111 forming the appearance.

Both side ends of the first switch cover 111 are formed with a 1-1st electrode exposure hole 111-1 and a 1-2nd electrode exposure hole 111-2, respectively.

Particularly, the bottom surface portion of the first switch cover 111 has a 1-1st touch sensor 112-1 and a 1-2nd touch sensor 112-2 spaced apart from each other and attached.

At this time, a 1-1st electrode 116-1 inserted into the 1-1st electrode exposure hole 111-1 and exposed to the outside is formed to protrude from the 1-1st touch sensor 112-1, and a 1-2nd electrode 116-2 inserted into the 1-2nd electrode exposure hole 111-2 and exposed to the outside is formed to protrude from the 1-2nd touch sensor 112-2.

Therefore, when the user's hand touches one side surface or the other side surface of the first switch cover 111, the touch sensing may be performed by contacting the 1-1st electrode 116-1 or the 1-2nd electrode 116-2.

Further, the bottom surface portion of the first switch cover 111 is mounted with a first moving block 113 capable of seesaw motion.

Further, a 1-1st plunger 114-1 and a 1-2nd plunger 114-2 are connected to the bottom portions of both sides of the first moving block 113 to be movable upward and downward, respectively.

At this time, since the main controller 180 is provided in a printed circuit board (PCB) type, predetermined locations of the main controller 180 are mounted with a pair of tact switches 181 pressed by the 1-1st plunger 114-1 and the 1-2nd plunger 114-2.

Further, the 1-1st touch sensor 112-1 and the main controller 180 are electrically conductively connected by a 1-1st conductive spring 115-1 such that the sensing signal of the 1-1st touch sensor 112-1 may be transmitted to the main controller 180.

Likewise, the 1-2nd touch sensor 112-2 and the main controller 180 are electrically conductively connected by a 1-2nd conductive spring 115-2 such that the sensing signal of the 1-2nd touch sensor 112-2 may be transmitted to the main controller 180.

Therefore, when the user's hand touches one side surface of the first switch cover 111, the sensing of the 1-1st touch sensor 112-1 is performed by contacting the 1-1st electrode 116-1, and the sensing signal of the 1-1st touch sensor 112-1 is output to the main controller 180 through the 1-1st conductive spring 115-1.

Subsequently, the main controller 180 determines the operation direction of the power seat and the operation direction of the switch according to the sensing signal of the 1-1st touch sensor 112-1 as the forward movement direction of the seat.

Figure 4A:
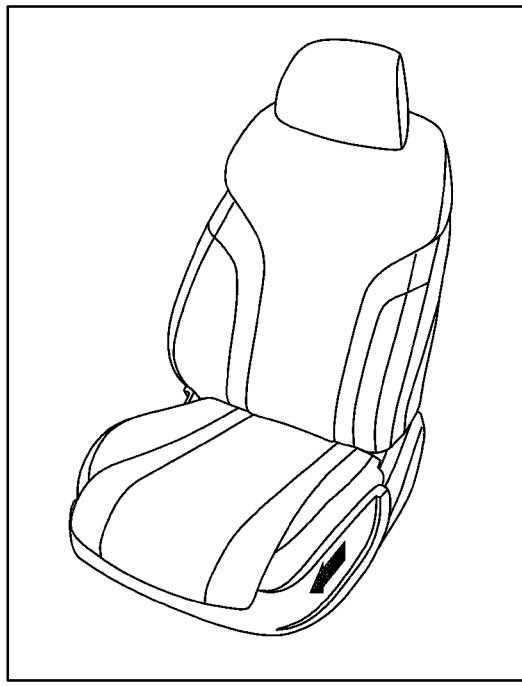
FIGS. 4A and 4B are diagrams illustrating that images guiding the operation direction of a power seat are differently displayed on a display according to the sensing of each touch sensor embedded in the first switch according to one form of the present disclosure.
Figure 4A:
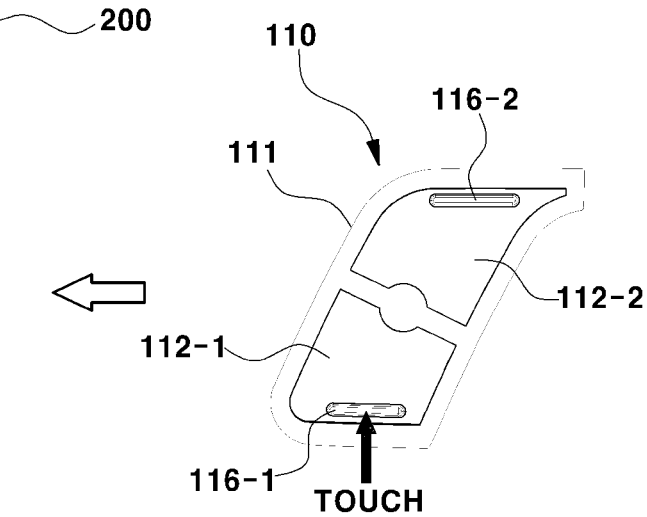

Subsequently, the main controller 180 transmits a display command signal according to the signal determined as the forward movement direction of the seat to the display 200, such that as illustrated in FIG. 4A, the seat image and one arrow image guiding the forward movement direction of the seat may be displayed on the display 200.

Therefore, when watching the display 200, the user may easily recognize that the forward movement operation of the seat may be performed when currently pressing one side surface of the first switch cover 111 in the state of touching the hand on the one side surface of the first switch cover 111.

At this time, when the user actually presses the one side surface of the first switch cover 111 in the state of touching the hand on the one side surface of the first switch cover 111, the 1-1st plunger 114-1 presses the tact switch 181 while moving downward, and subsequently, the main controller 180 recognizes a pressed signal of the tact switch 181 and applies a driving signal to a motor for the forward movement operation of the seat.

Of course, when the user releases a force of pressing the one side surface of the first switch cover 111, the 1-1st plunger 114-1 and the first switch cover 111 move upward to the original locations by an elastic reaction force of the tact switch 181.

On the other hand, when the user's hand touches the other side surface of the first switch cover 111, the sensing of the 1-2nd touch sensor 112-2 is performed by contacting the 1-2nd electrode 116-2, and the sensing signal of the 1-2nd touch sensor 112-2 is output to the main controller 180 through the 1-2nd conductive spring 115-2.

Subsequently, the main controller 180 determines the operation direction of the power seat and the operation direction of the switch according to the sensing signal of the 1-2nd touch sensor 112-2 as the backward movement direction of the seat.

Figure 4B:
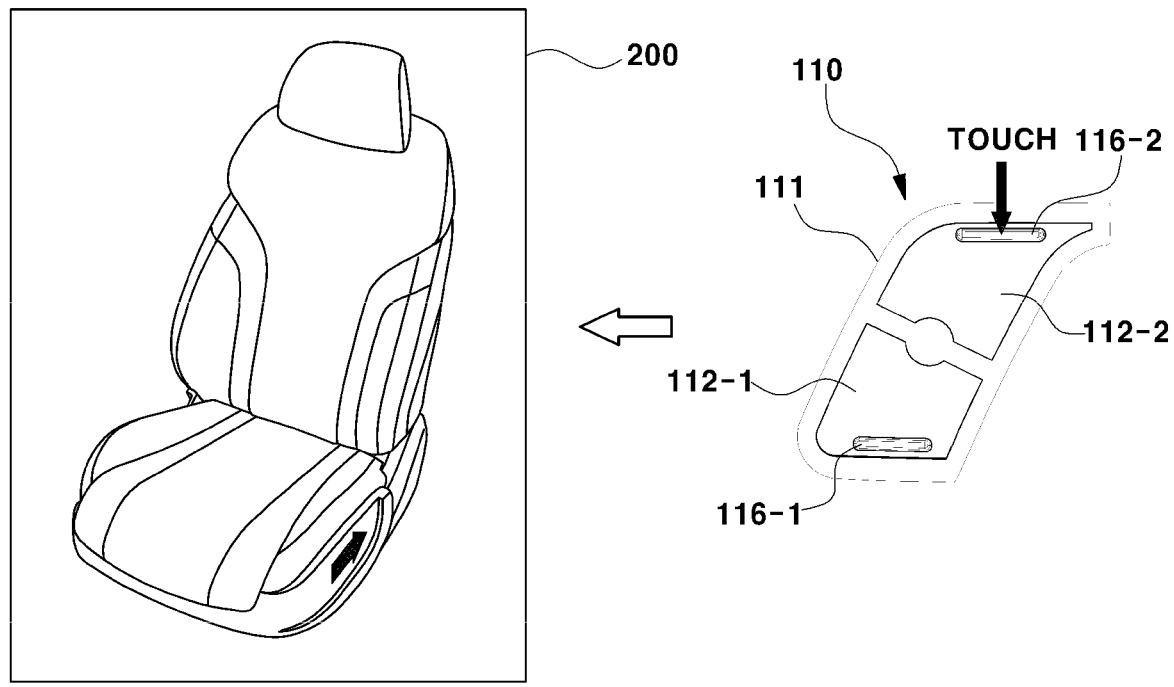

Subsequently, the main controller 180 transmits a display command signal according to the signal determined as the backward movement direction of the seat to the display 200, such that as illustrated in FIG. 4B, the seat image and one arrow image guiding the backward movement direction of the seat may be displayed on the display 200.

Therefore, when watching the display 200, the user may easily recognize that the backward movement operation of the seat may be performed when currently pressing the other side surface of the first switch cover 111 in the state of touching the hand on the other side surface of the first switch cover 111.

At this time, when the user actually presses the other side surface of the first switch cover 111 in the state of touching the hand on the other side surface of the first switch cover 111, the 1-2nd plunger 114-2 presses the tact switch 181 while moving downward, and subsequently, the main controller 180 recognizes the pressed signal of the tact switch 181 and applies a driving signal to the motor for the backward movement of the seat.

Figure 5:
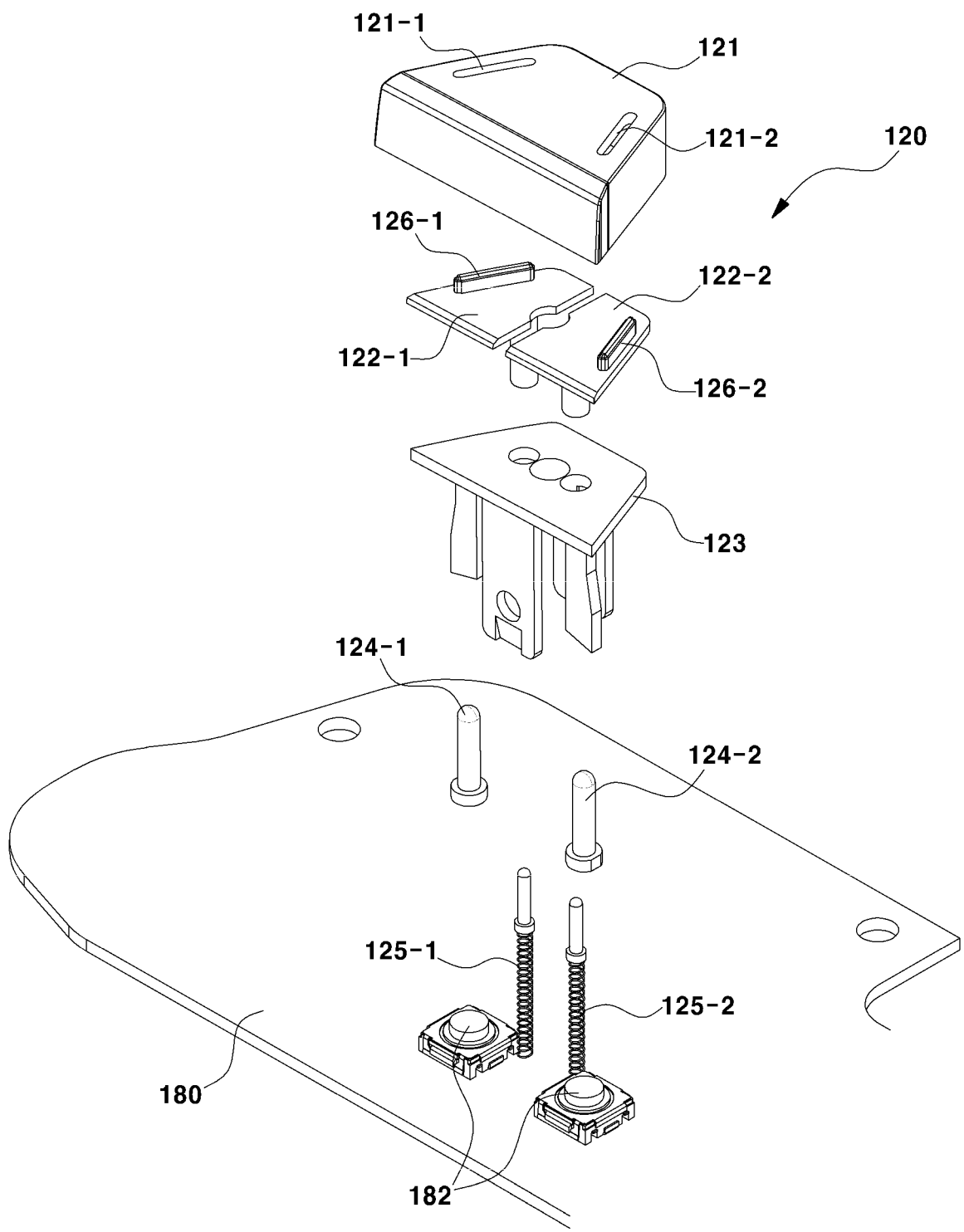
FIG. 5 is an exploded perspective diagram illustrating a second switch of the switch module according to one form of the present disclosure.
Figure 6:
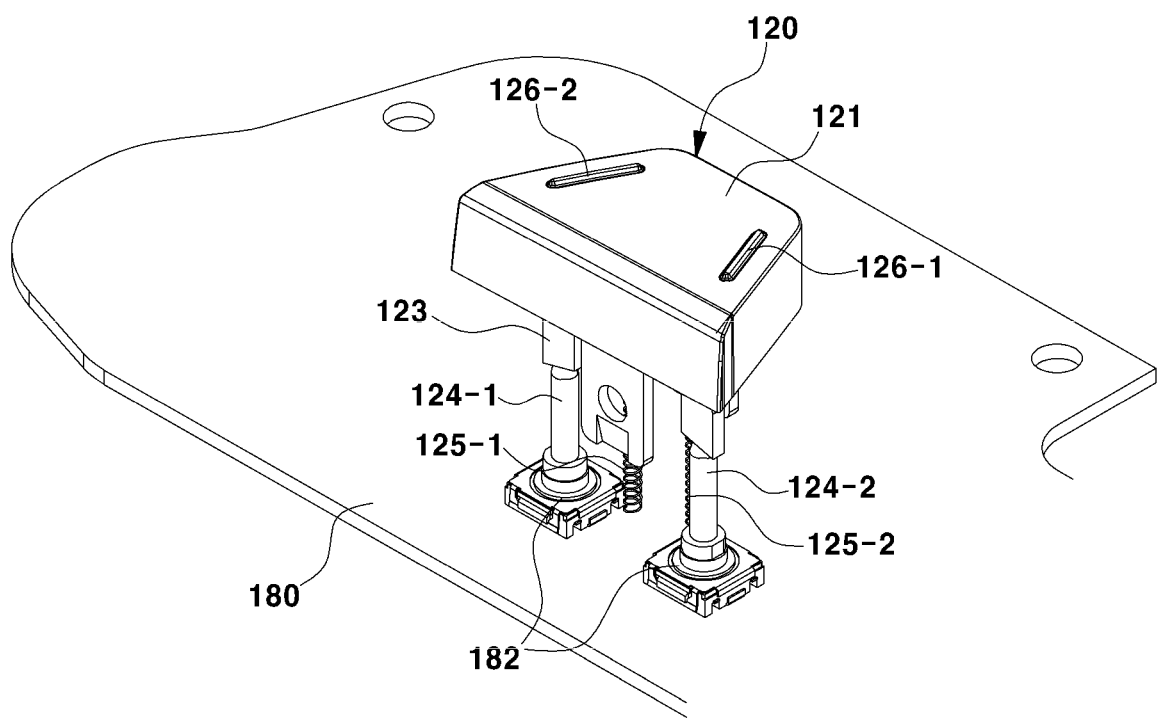
FIG. 6 is an assembling perspective diagram illustrating the second switch of the switch module according to one form of the present disclosure.

FIGS. 5 and 6 are diagrams illustrating a second switch of the switch module according to some forms of the present disclosure, and a reference numeral 120 indicates a second seesaw type switch.

The seesaw type second switch 120 is configured for operating the vertical height adjustment (two directions) of the seat, and includes a second switch cover 121 forming the appearance.

Both side ends of the second switch cover 121 are formed with a 2-1st electrode exposure hole 121-1 and a 2-2nd electrode exposure hole 121-2, respectively.

Particularly, the bottom surface portion of the second switch cover 121 has a 2-1st touch sensor 122-1 and a 2-2nd touch sensor 122-2 spaced apart from each other and attached.

At this time, a 2-1st electrode 126-1 inserted into the 2-1st electrode exposure hole 121-1 and exposed to the outside is formed to protrude from the 2-1st touch sensor 122-1, and a 2-2nd electrode 126-2 inserted into the 2-2nd electrode exposure hole 121-2 and exposed to the outside is formed to protrude from the 2-2nd touch sensor 122-2.

Therefore, when the user's hand touches one side surface or the other side surface of the second switch cover 121, the touch sensing may be performed by contacting the 2-1st electrode 126-1 or the 2-2nd electrode 126-2.

Further, the bottom surface portion of the second switch cover 121 is mounted with a second moving block 123 capable of seesaw motion.

Further, a 2-1st plunger 124-1 and a 2-2nd plunger 124-2 are connected to the bottom portions of both sides of the second moving block 123 to be movable upward and downward, respectively.

At this time, since the main controller 180 is provided in a printed circuit board (PCB) type, predetermined locations of the main controller 180 are mounted with a pair of tact switches 182 pressed by the 2-1st plunger 124-1 and the 2-2nd plunger 124-2.

Further, the 2-1st touch sensor 122-1 and the main controller 180 are electrically conductively connected by a 2-1st conductive spring 125-1 such that the sensing signal of the 2-1st touch sensor 122-1 may be transmitted to the main controller 180.

Likewise, the 2-2nd touch sensor 122-2 and the main controller 180 are electrically conductively connected by a 2-2nd conductive spring 125-2 such that the sensing signal of the 2-2nd touch sensor 122-2 may be transmitted to the main controller 180.

Therefore, when the user's hand touches one side surface of the second switch cover 131, the sensing of the 2-1st touch sensor 122-1 is performed by contacting the 2-1st electrode 126-1, and the sensing signal of the 2-1st touch sensor 122-1 is output to the main controller 180 through the 2-1st conductive spring 125-1.

Subsequently, the main controller 180 determines the operation direction of the power seat and the operation direction of the switch according to the sensing signal of the 2-1st touch sensor 122-1 as an ascending movement direction of the seat.

Figure 7A:
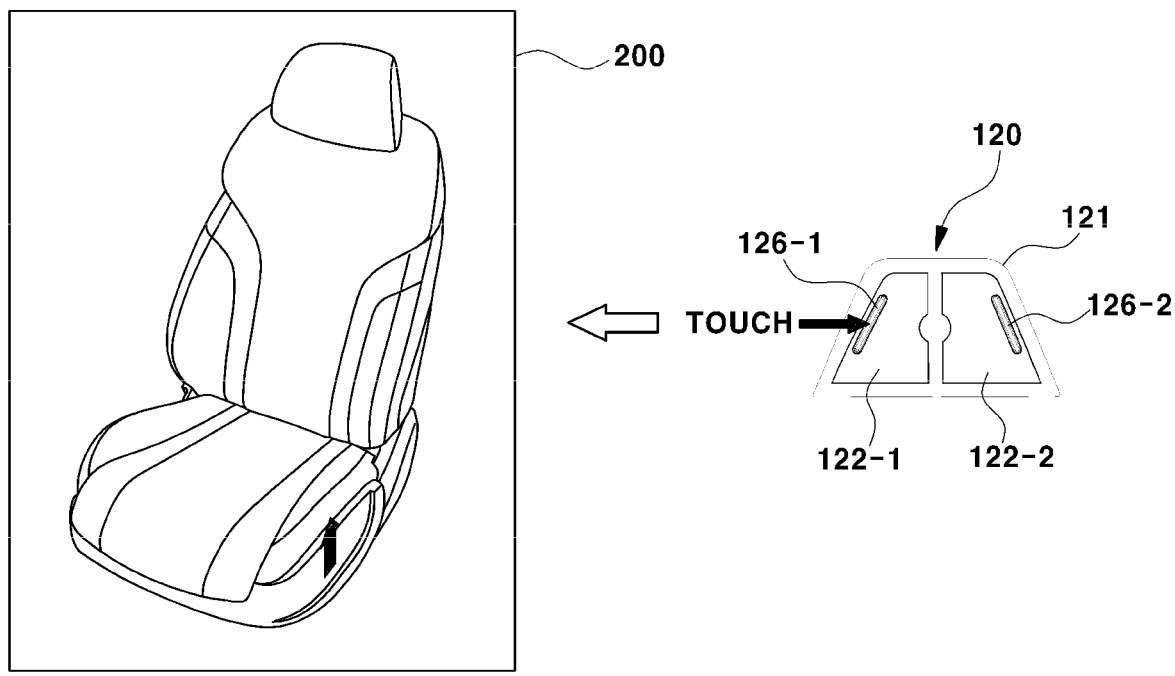
FIGS. 7A and 7B are diagrams illustrating that images guiding the operation direction of the power seat are differently displayed on a display according to the sensing of each touch sensor embedded in the second switch according to one form of the present disclosure.

Subsequently, the main controller 180 transmits a display command signal according to the signal determined as the ascending movement direction of the seat to the display 200, such that as illustrated in FIG. 7A, the seat image and one arrow image guiding the ascending movement direction of the seat may be displayed on the display 200.

Therefore, when watching the display 200, the user may easily recognize that the ascending movement operation of the seat may be performed when the user's hand currently presses one side surface of the second switch cover 121 in the state of touching the one side surface thereof.

At this time, when the user actually presses the one side surface of the second switch cover 121 in the state of touching the hand on the one side surface of the second switch cover 121, the 2-1st plunger 124-1 presses the tact switch 182 while moving downward, and subsequently, the main controller 180 recognizes a pressed signal of the tact switch 182 and applies a driving signal to the motor for the ascending movement operation of the seat.

When the user releases a force of pressing the one side surface of the second switch cover 121, the 2-1st plunger 124-1 and the second switch cover 121 move upward to the original locations by an elastic reaction force of the tact switch 182.

On the other hand, when the user's hand touches the other side surface of the second switch cover 121, the sensing of the 2-2nd touch sensor 122-2 is performed by contacting the 2-2nd electrode 126-2, and the sensing signal of the 2-2nd touch sensor 122-2 is output to the main controller 180 through the 2-2nd conductive spring 125-2.

Subsequently, the main controller 180 determines the operation direction of the power seat and the operation direction of the switch according to the sensing signal of the 2-2nd touch sensor 122-2 as the descending movement direction of the seat.

Figure 7B:
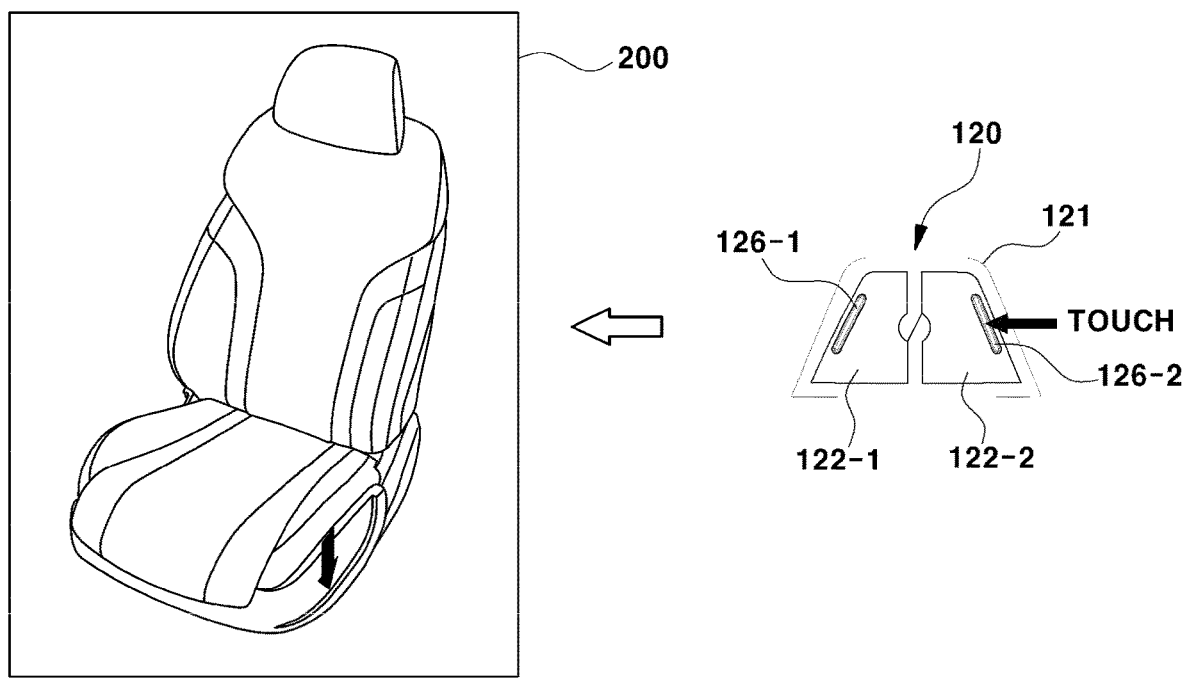

Subsequently, the main controller 180 transmits a display command signal according to the signal determined as the descending movement direction of the seat to the display 200, such that as illustrated in FIG. 7B, the seat image and one arrow image guiding the descending movement direction of the seat may be displayed on the display 200.

Therefore, when watching the display 200, the user may easily recognize that the descending movement operation of the seat may be performed when currently pressing the other side surface of the second switch cover 121 in the state of touching the hand on the other side surface of the second switch cover 121.

At this time, when the user actually presses the other side surface of the second switch cover 121 in the state of touching the hand on the other side surface of the second switch cover 121, the 2-2nd plunger 124-2 presses the tact switch 182 while moving downward, and subsequently, the main controller 180 recognizes a pressed signal of the tact switch 182 and applies a driving signal to the motor for the descending movement.

Figure 8:
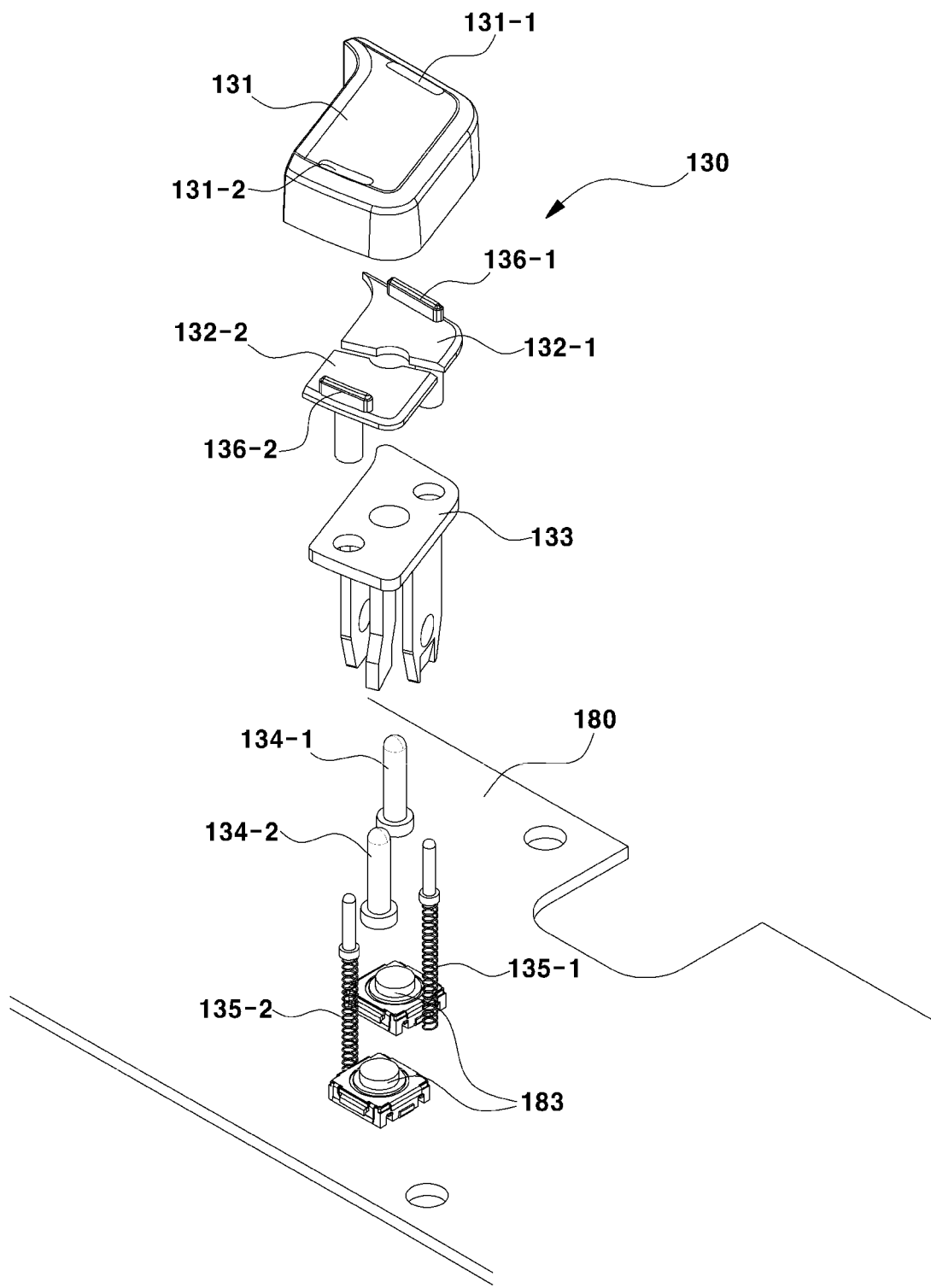
FIG. 8 is an exploded perspective diagram illustrating a third switch of the switch module according to one form of the present disclosure.
Figure 9:
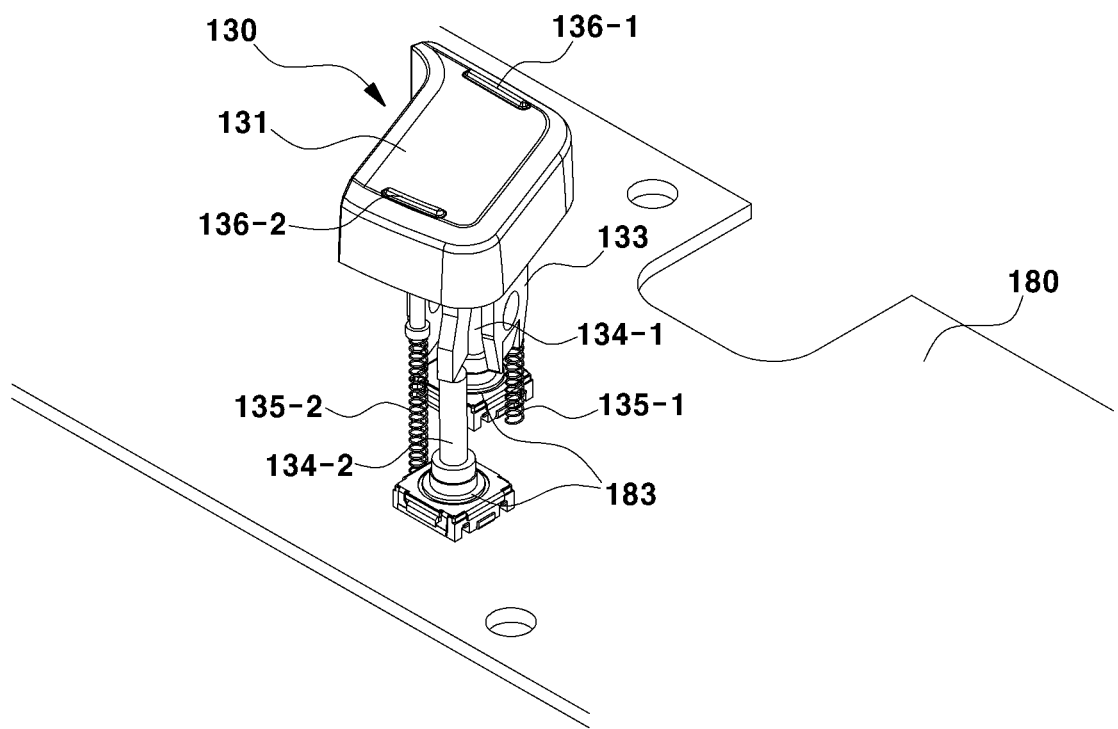
FIG. 9 is an assembling perspective diagram illustrating the third switch of the switch module according to one form of the present disclosure.

FIGS. 8 and 9 are diagrams illustrating a third switch of the switch module according to the present disclosure, and a reference numeral 130 indicates a third seesaw type switch.

The seesaw type third switch 130 is configured for operating the front portion up and down adjustment (two directions) of the seat cushion, and includes a third switch cover 131 forming the appearance.

Both side ends of the third switch cover 131 are formed with a 3-1st electrode exposure hole 131-1 and a 3-2nd electrode exposure hole 131-2, respectively.

Particularly, the bottom surface portion of the third switch cover 131 has a 3-1st touch sensor 132-1 and a 3-2nd touch sensor 132-2 spaced apart from each other and attached.

At this time, a 3-1st electrode 136-1 inserted into the 3-1st electrode exposure hole 131-1 and exposed to the outside is formed to protrude from the 3-1st touch sensor 132-1, and a 3-2nd electrode 136-2 inserted into the 3-2nd electrode exposure hole 131-2 and exposed to the outside is formed to protrude from the 3-2nd touch sensor 132-2.

Subsequently, when the user's hand touches one side surface or the other side surface of the third switch cover 131, the touch sensing may be performed by contacting the 3-1st electrode 136-1 or the 3-2nd electrode 136-2.

Further, the bottom surface portion of the third switch cover 131 is mounted with a third moving block 133 capable of seesaw motion.

Further, a 3-1st plunger 134-1 and a 3-2nd plunger 134-2 are connected to the bottom portions of both sides of the third moving block 133 to be movable upward and downward, respectively.

At this time, since the main controller 180 is provided in a printed circuit board (PCB) type, predetermined locations of the main controller 180 are mounted with a pair of tact switches 183 pressed by the 3-1st plunger 134-1 and the 3-2nd plunger 134-2.

Further, the 3-1st touch sensor 132-1 and the main controller 180 are electrically conductively connected by a 3-1st conductive spring 135-1 such that the sensing signal of the 3-1st touch sensor 132-1 may be transmitted to the main controller 180.

Likewise, the 3-2nd touch sensor 132-2 and the main controller 180 are electrically conductively connected by a 3-2nd conductive spring 135-2 such that the sensing signal of the 3-2nd touch sensor 132-2 may be transmitted to the main controller 180.

Therefore, when the user's hand touches one side surface of the third switch cover 131, the sensing of the 3-1st touch sensor 132-1 is performed by contacting the 3-1st electrode 136-1, and the sensing signal of the 3-1st touch sensor 132-1 is output to the main controller 180 through the 3-1st conductive spring 135-1.

Subsequently, the main controller 180 determines the operation direction of the power seat and the operation direction of the switch according to the sensing signal of the 3-1st touch sensor 132-1 as the front portion up direction of the seat cushion.

Figure 10A:
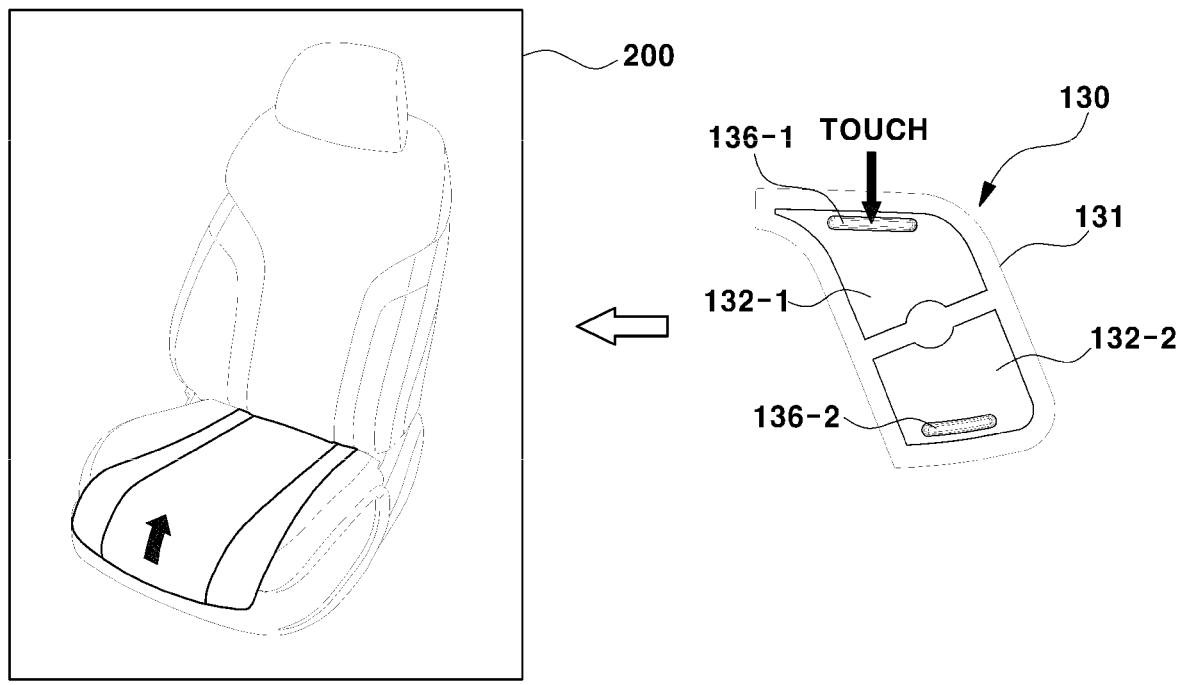
FIGS. 10A and 10B are diagrams illustrating that images guiding the operation direction of the power seat are differently displayed on a display according to the sensing of each touch sensor embedded in the third switch according to one form of the present disclosure.

Subsequently, the main controller 180 transmits a display command signal according to the signal determined as the front portion up direction of the seat cushion to the display 200, such that as illustrated in FIG. 10A, the seat image and one arrow image guiding the front portion up direction of the seat cushion may be displayed on the display 200.

Therefore, when watching the display 200, the user may easily recognize that the front portion up operation of the seat cushion may be performed when currently pressing one side surface of the third switch cover 131 in the state of touching the hand on the one side surface of the third switch cover 131.

At this time, when the user actually presses the one side surface of the third switch cover 131 in the state of touching the hand on one side surface of the third switch cover 131, the 3-1st plunger 134-1 presses the tact switch 183 while moving downward, and subsequently, the main controller 180 recognizes a pressed signal of the tact switch 183 and applies a driving signal to the motor for the front portion up operation of the seat cushion.

Of course, when the user releases a force of pressing the one side surface of the third switch cover 131, the 3-1st plunger 134-1 and the third switch cover 131 move upward to the original locations by an elastic reaction force of the tact switch 183.

On the other hand, when the user touches the other side surface of the third switch cover 131, the sensing of the 3-2nd touch sensor 132-2 is performed by contacting the 3-2nd electrode 136-2, and the sensing signal of the 3-2nd touch sensor 132-2 is output to the main controller 180 through the 3-2nd conductive spring 135-2.

Subsequently, the main controller 180 determines the operation direction of the power seat and the operation direction of the switch according to the sensing signal of the 3-2nd touch sensor 132-2 as the front portion down direction of the seat cushion.

Figure 10B:
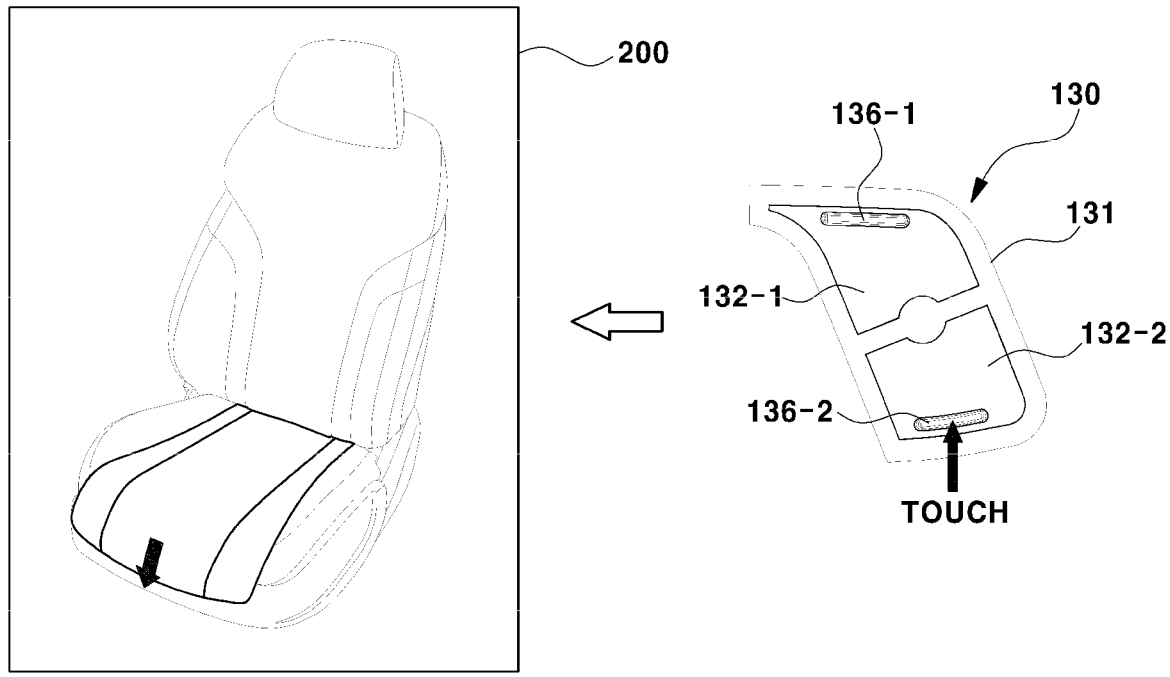

Subsequently, the main controller 180 transmits a display command signal according to the signal determined as the front portion down direction of the seat cushion to the display 200, such that as illustrated in FIG. 10B, the seat image and one arrow image guiding the front portion down direction of the seat cushion may be displayed on the display 200.

Therefore, when watching the display 200, the user may easily recognize that the front portion down operation of the seat cushion may be performed when currently pressing the other side surface of the third switch cover 131 in the state of touching the hand on the other side surface of the third switch cover 131.

At this time, when the user actually presses the other side surface of the third switch cover 131 in the state of touching the hand on the other side surface of the third switch cover 131, the 3-2nd plunger 134-2 presses the tact switch 183 while moving downward, and subsequently, the main controller 180 recognizes a pressed signal of the tact switch 183 and applies a driving signal to the motor for the front portion down operation of the seat cushion.

Figure 11:
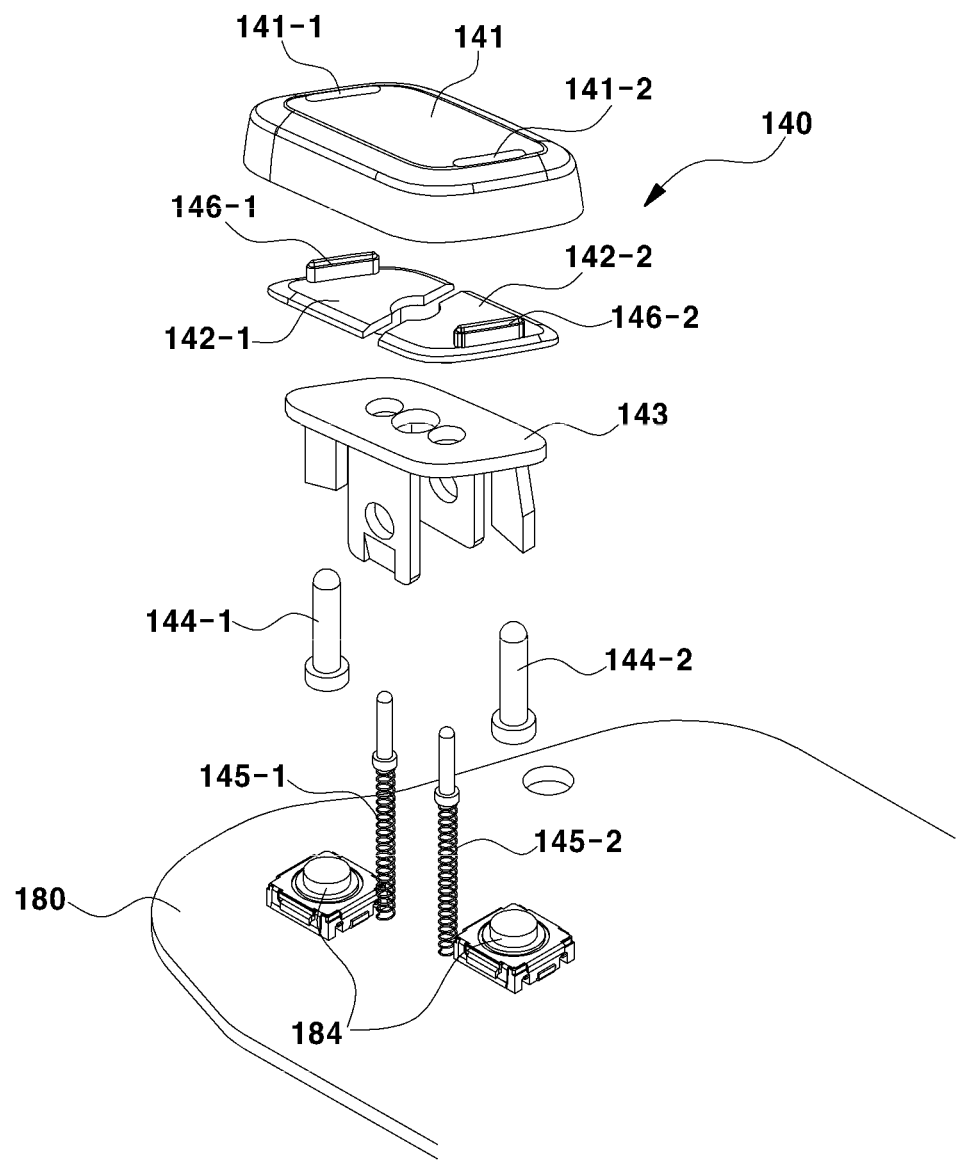
FIG. 11 is an exploded perspective diagram illustrating a fourth switch of the switch module according to one form of the present disclosure.
Figure 12:
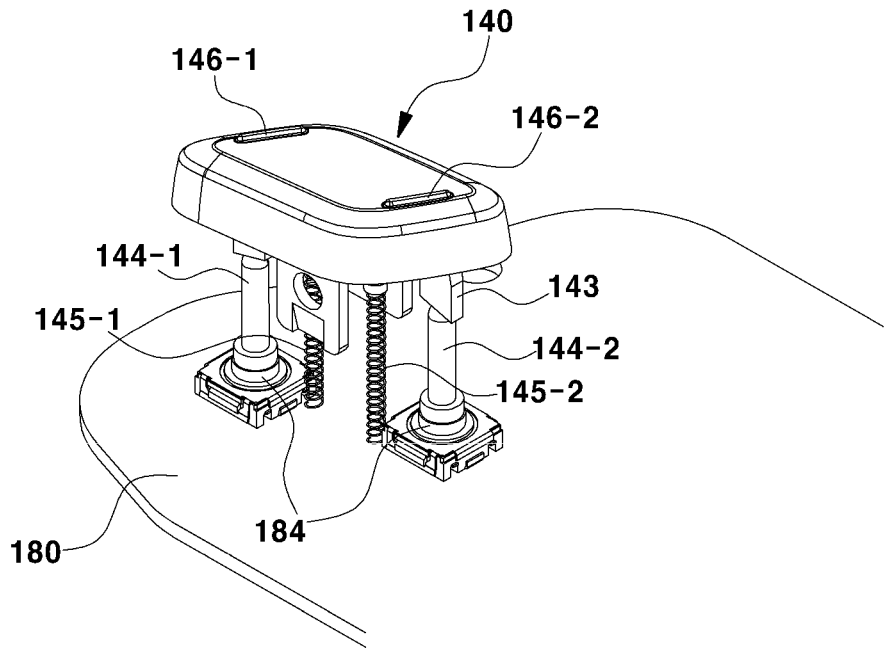
FIG. 12 is an assembling perspective diagram illustrating the fourth switch of the switch module according to one form of the present disclosure.

FIGS. 11 and 12 are diagrams illustrating a fourth switch of the switch module according to the present disclosure, and a reference numeral 140 indicates a seesaw type fourth switch.

The seesaw type fourth switch 140 is configured for operating the extension operation for the front portion of the seat cushion, and includes a fourth switch cover 141 forming the appearance.

Both side ends of the fourth switch cover 141 are formed with a 4-1st electrode exposure hole 141-1 and a 4-2nd electrode exposure hole 141-2, respectively.

Particularly, the bottom surface portion of the fourth switch cover 141 has a 4-1st touch sensor 142-1 and a 4-2nd touch sensor 142-2 spaced apart from each other and attached.

At this time, a 4-1st electrode 146-1 inserted into the 4-1st electrode exposure hole 141-1 and exposed to the outside is formed to protrude from the 4-1st touch sensor 142-1, and a 4-2nd electrode 146-2 inserted into the 4-2nd electrode exposure hole 141-2 and exposed to the outside is formed to protrude from the 4-2nd touch sensor 142-2.

Therefore, when the user's hand touches one side surface or the other side surface of the fourth switch cover 141, the touching sensing may be performed by contacting the 4-1st electrode 146-1 or the 4-2nd electrode 146-2.

Further, the bottom surface portion of the fourth switch cover 141 is mounted with a fourth moving block 143 capable of seesaw motion.

Further, a 4-1st plunger 144-1 and a 4-2nd plunger 144-2 are connected to the bottom portions of both sides of the fourth moving block 143 to be movable upward and downward, respectively.

At this time, since the main controller 180 is provided in a printed circuit board (PCB) type, predetermined locations of the main controller 180 are mounted with a pair of tact switches 184 pressed by the 4-1st plunger 144-1 and the 4-2nd plunger 144-2.

Further, the 4-1st touch sensor 142-1 and the main controller 180 are electrically conductively connected by a 4-1st conductive spring 145-1 such that the sensing signal of the 4-1st touch sensor 142-1 may be transmitted to the main controller 180.

Likewise, the 4-2nd touch sensor 142-2 and the main controller 180 are electrically conductively connected by a 4-2nd conductive spring 145-2 such that the sensing signal of the 4-2nd touch sensor 142-2 may be transmitted to the main controller 180.

Therefore, when the user's hand touches one side surface of the fourth switch cover 141, the sensing of the 4-1st touch sensor 142-1 is performed by contacting the 4-1st electrode 146-1, and the sensing signal of the 4-1st touch sensor 142-1 is output to the main controller 180 through the 4-1st conductive spring 145-1.

Subsequently, the main controller 180 determines the operation direction of the power seat and the operation direction of the switch according to the sensing signal of the 4-1st touch sensor 142-1 as the extension forward direction for the front portion of the seat cushion.

Figure 13A:
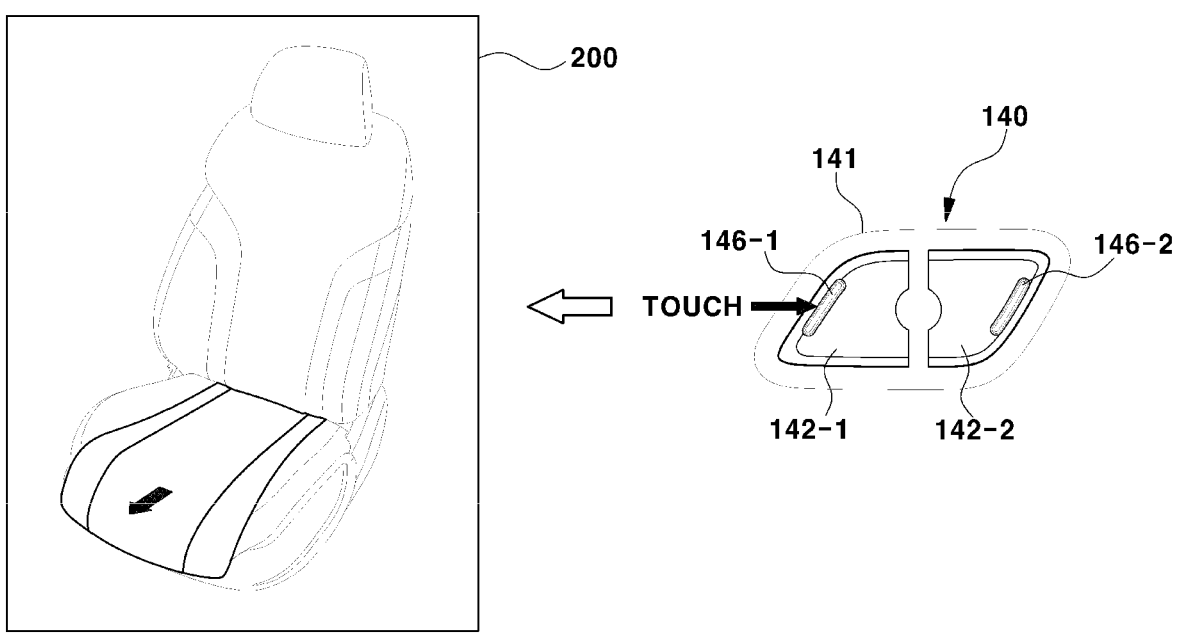
FIGS. 13A and 13B are diagrams illustrating that images guiding the operation direction of the power seat are differently displayed on a display according to the sensing of each touch sensor embedded in the fourth switch according to one form of the present disclosure.

Subsequently, the main controller 180 transmits a display command signal according to the signal determined as the extension forward direction for the front end of the seat cushion to the display 200, such that as illustrated in FIG. 13A, the seat image and one arrow image guiding the extension forward operation direction for the front end of the seat cushion may be displayed on the display 200.

Therefore, when watching the display 200, the user may easily recognize that the extension forward operation in which the length of the front portion of the seat cushion extends may be performed when currently pressing one side surface of the fourth switch cover 141 in the state of touching the hand on the one side surface of the fourth switch cover 141.

At this time, when the user actually presses the one side surface of the fourth switch cover 141 in the state of touching the hand on the one side surface of the fourth switch cover 141, the 4-1st plunger 144-1 presses the tact switch 184 while moving downward, and subsequently, the main controller 180 recognizes a pressed signal of the tact switch 184 and applies a driving signal to the motor for the extension forward operation of the front end of the seat cushion.

Of course, when the user releases a force of pressing the one side surface of the fourth switch cover 141, the 4-1st plunger 144-1 and the fourth switch cover 141 move upward to the original locations by an elastic reaction force of the tact switch 184.

On the other hand, when the user's hand touches the other side surface of the fourth switch cover 141, the sensing of the 4-2nd touch sensor 142-2 is performed by contacting the 4-2nd electrode 146-2, and the sensing signal of the 4-2nd touch sensor 142-2 is output to the main controller 180 through the 4-2nd conductive spring 145-2.

Subsequently, the main controller 180 determines the operation direction of the power seat and the operation direction of the switch according to the sensing signal of the 4-2nd touch sensor 142-2 as the extension backward direction for the front portion of the seat cushion.

Figure 13B:
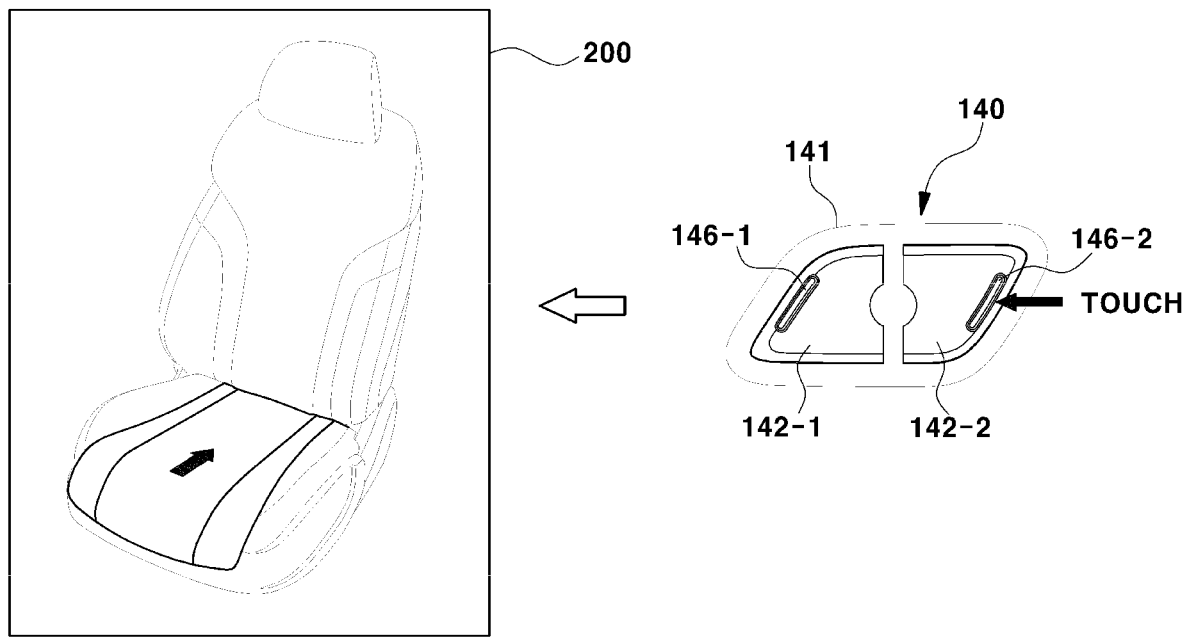

Subsequently, the main controller 180 transmits a display command signal according to the signal determined as the extension backward direction for the front end of the seat cushion to the display 200, such that as illustrated in FIG. 13B, the seat image and one arrow image guiding the extension backward operation direction for the front end of the seat cushion may be displayed on the display 200.

Therefore, when watching the display 200, the user may easily recognize that the extension backward operation in which the length of the front portion of the seat cushion is decreased may be performed when currently pressing the other side surface of the fourth switch cover 141 in the state of touching the hand on the other side surface of the fourth switch cover 141.

At this time, when the user actually presses the other side surface of the fourth switch cover 141 in the state of touching the hand on the other side surface of the fourth switch cover 141, the 4-2nd plunger 144-2 presses the tact switch 184 while moving downward, and subsequently, the main controller 180 recognizes a pressed signal of the tact switch 184 and applies a driving signal to the motor for the extension backward operation of the front end of the seat cushion.

Figure 14:
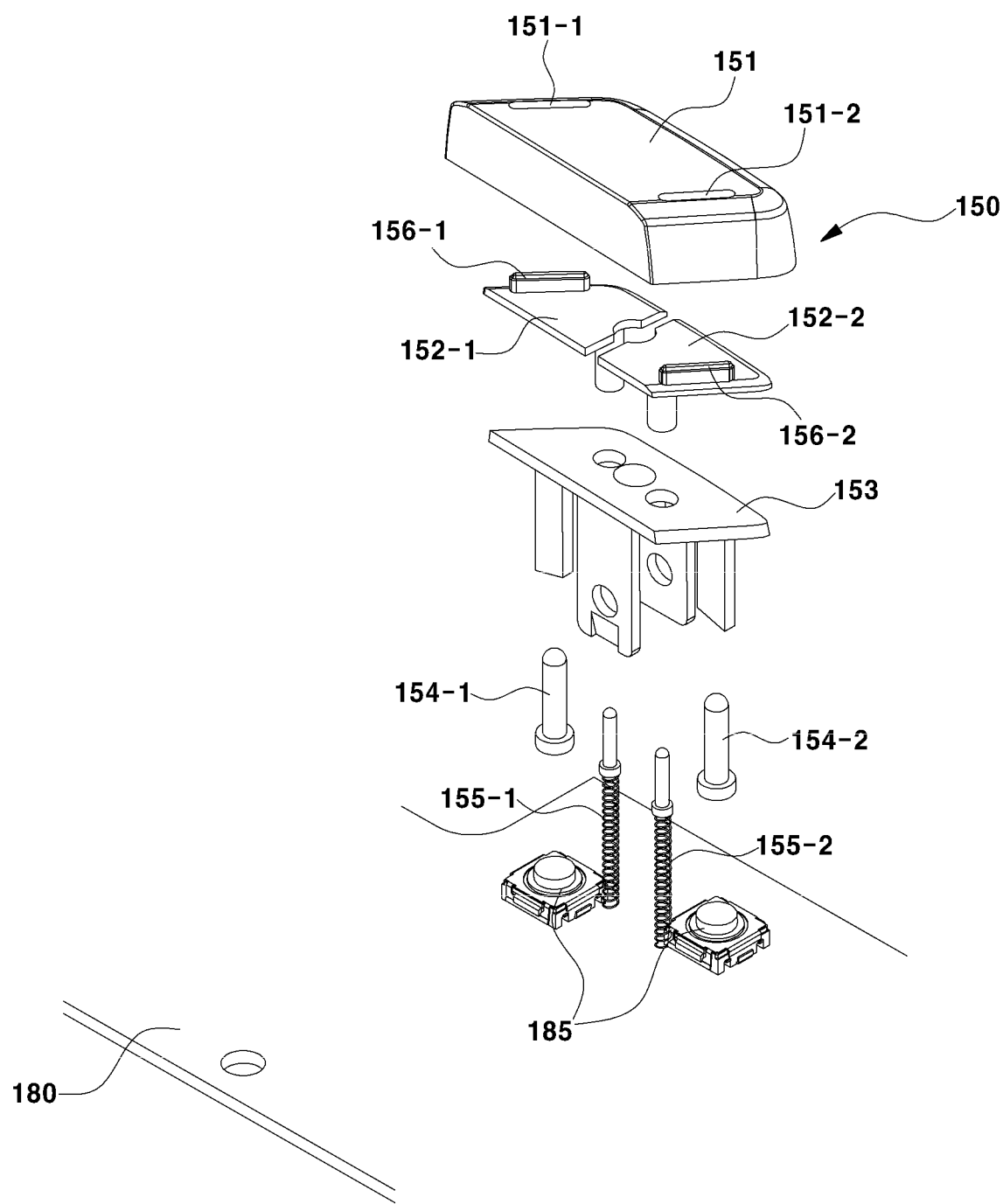
FIG. 14 is an exploded perspective diagram illustrating a fifth switch of the switch module according to one form of the present disclosure.
Figure 15:
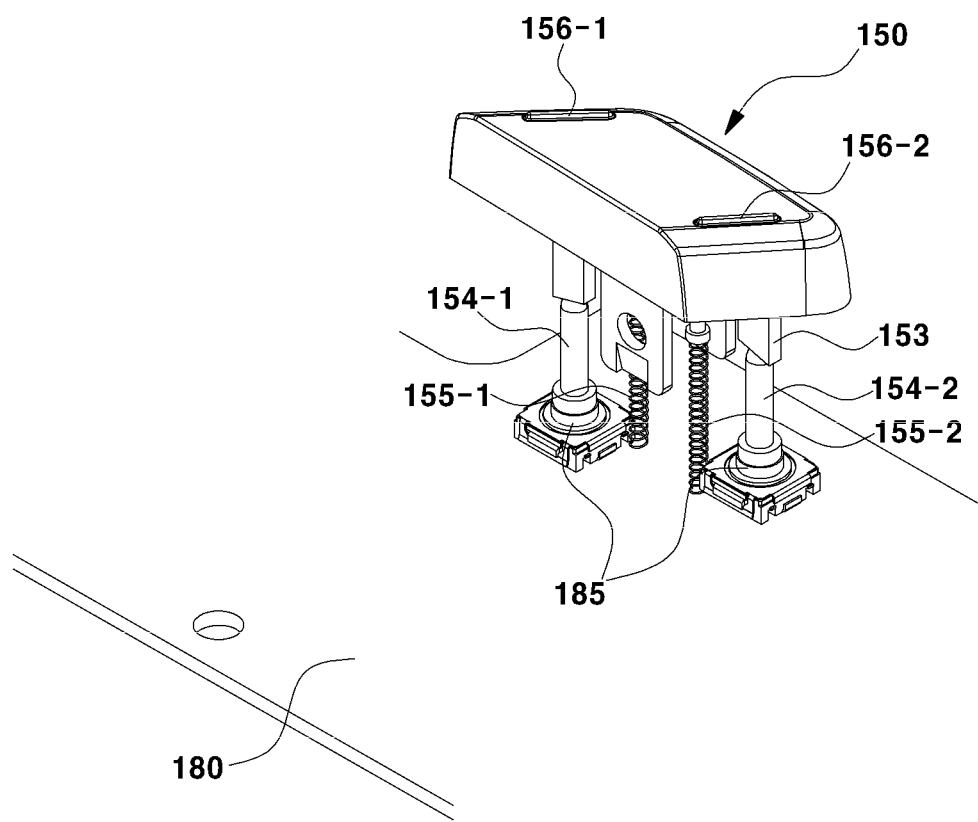
FIG. 15 is an assembling perspective diagram illustrating the fifth switch of the switch module according to one form of the present disclosure.

FIGS. 14 and 15 are diagrams illustrating a fifth switch of the switch module according to the present disclosure, and a reference numeral 150 indicates a seesaw type fifth switch.

The seesaw type fifth switch 150 is configured for the reclining operation of the seat cushion, and includes a fifth switch cover 151 forming the appearance.

Both side ends of the fifth switch cover 151 are formed with a 5-1st electrode exposure hole 151-1 and a 5-2nd electrode exposure hole 151-2, respectively.

Particularly, the bottom surface portion of the fifth switch cover 151 has a 5-1st touch sensor 152-1 and a 5-2nd touch sensor 152-2 spaced apart from each other and attached.

At this time, a 5-1st electrode 156-1 inserted into the 5-1st electrode exposure hole 151-1 and exposed to the outside is formed to protrude from the 5-1st touch sensor 152-1, and a 5-2nd electrode 156-2 inserted into the 5-2nd electrode exposure hole 151-2 and exposed to the outside is formed to protrude from the 5-2nd touch sensor 152-2.

Therefore, when the user's hand touches one side surface or the other side surface of the fifth switch cover 151, the touch sensing may be performed by contacting the 5-1st electrode 156-1 or the 5-2nd electrode 156-2.

Further, the bottom surface portion of the fifth switch cover 151 is mounted with a fifth moving block 153 capable of seesaw motion.

Further, a 5-1st plunger 154-1 and a 5-2nd plunger 154-2 are connected to the bottom portions of both sides of the fifth moving block 153 to be movable upward and downward.

At this time, since the main controller 180 is provided in a printed circuit board (PCB) type, predetermined locations of the main controller 180 are mounted with a pair of tact switches 185 pressed by the 5-1st plunger 154-1 and the 5-2nd plunger 154-2.

Further, the 5-1st touch sensor 152-1 and the main controller 180 are electrically conductively connected by a 5-1st conductive spring 155-1 such that the sensing signal of the 5-1st touch sensor 152-1 may be transmitted to the main controller 180.

Likewise, the 5-2nd touch sensor 152-2 and the main controller 180 are electrically conductively connected by a 5-2nd conductive spring 155-2 such that the sensing signal of the 5-2nd touch sensor 152-2 may be transmitted to the main controller 180.

Therefore, when the user's hand touches one side surface of the fifth switch cover 151, the sensing of the 5-1st touch sensor 152-1 is performed by contacting the 5-1st electrode 156-1, and the sensing signal of the 5-1st touch sensor 152-1 is output to the main controller 180 through the 5-1st conductive spring 155-1.

Subsequently, the main controller 180 determines the operation direction of the power seat and the operation direction of the switch according to the sensing signal of the 5-1st touch sensor 152-1 as the forward reclining direction of the seatback.

Figure 16A:
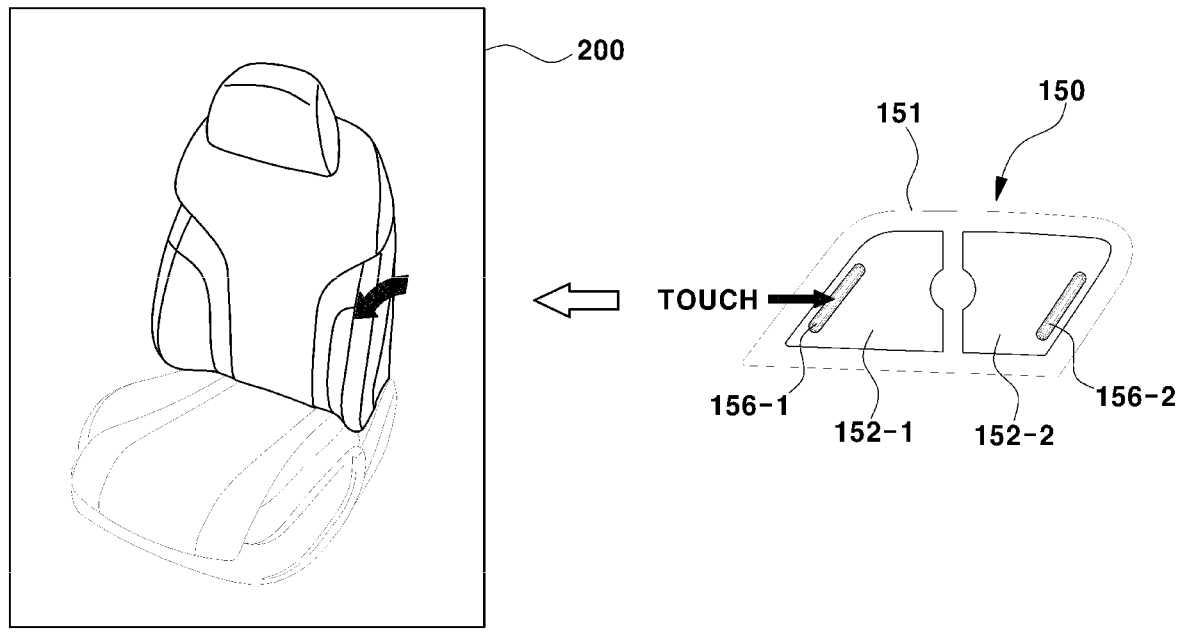
FIGS. 16A and 16B are diagrams illustrating that images guiding the operation direction of the power seat are differently displayed on a display according to the sensing of each touch sensor embedded in the fifth switch according to one form of the present disclosure.

Subsequently, the main controller 180 transmits a display command signal according to the signal determined as the forward reclining direction of the seatback to the display 200, such that as illustrated in FIG. 16A, the seat image and one arrow image guiding the forward reclining operation direction of the seatback may be displayed on the display 200.

Therefore, when watching the display 200, the user may easily recognize that the forward reclining operation of the seatback may be performed when currently pressing the one side surface of the fifth switch cover 151 in the state of touching the hand on the one side surface of the fifth switch cover 151.

At this time, when the user actually presses the one side surface of the fifth switch cover 151 in the state of touching the hand on the one side surface of the fourth switch cover 151, the 5-1st plunger 155-1 presses the tact switch 185 while moving downward, and subsequently, the main controller 180 recognizes a pressed signal of the tact switch 185 and applies a driving signal to the motor for the forward reclining operation of the seatback.

On the other hand, when the user touches the other side surface of the fifth switch cover 151, the sensing of the 5-2nd touch sensor 152-2 is performed by contacting the 5-2nd electrode 156-2, and the sensing signal of the 5-2nd touch sensor 152-2 is output to the main controller 180 through the 5-2nd conductive spring 155-2.

Subsequently, the main controller 180 determines the operation direction of the power seat and the operation direction of the switch according to the sensing signal of the 5-2nd touch sensor 152-2 as the backward reclining direction of the seatback.

Figure 16B:
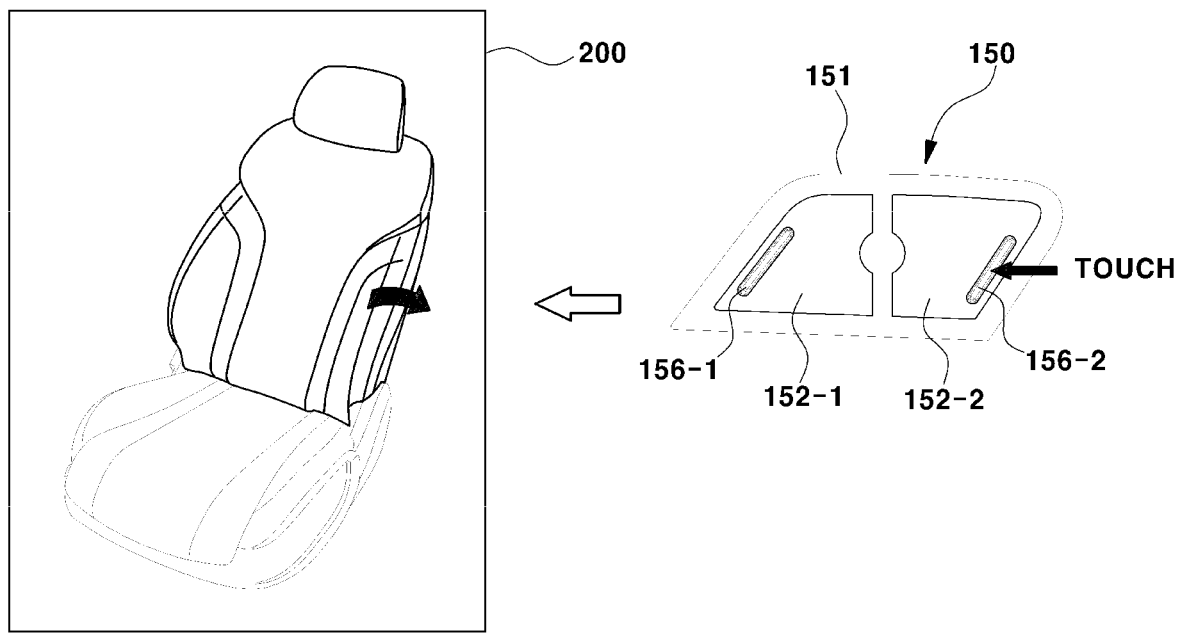

Subsequently, the main controller 180 transmits a display command signal according to the signal determined as the backward reclining direction of the seatback to the display 200, such that as illustrated in FIG. 16B, the seat image and one arrow image guiding the backward reclining operation direction of the seatback may be displayed on the display 200.

Therefore, when watching the display 200, the user may easily recognize that the backward reclining operation of the seatback may be performed when currently pressing the other side surface of the fifth switch cover 151 in the state of touching the hand on the other side surface of the fifth switch cover 151.

At this time, when the user actually presses the other side surface of the fifth switch cover 151 in the state of touching the hand on the other side surface of the fifth switch cover 151, the 5-2nd plunger 155-2 presses the tact switch 185 while moving downward, and subsequently, the main controller 180 recognizes a pressed signal of the tact switch 185 and applies a driving signal to the motor for the backward reclining operation of the seatback.

Figure 17:
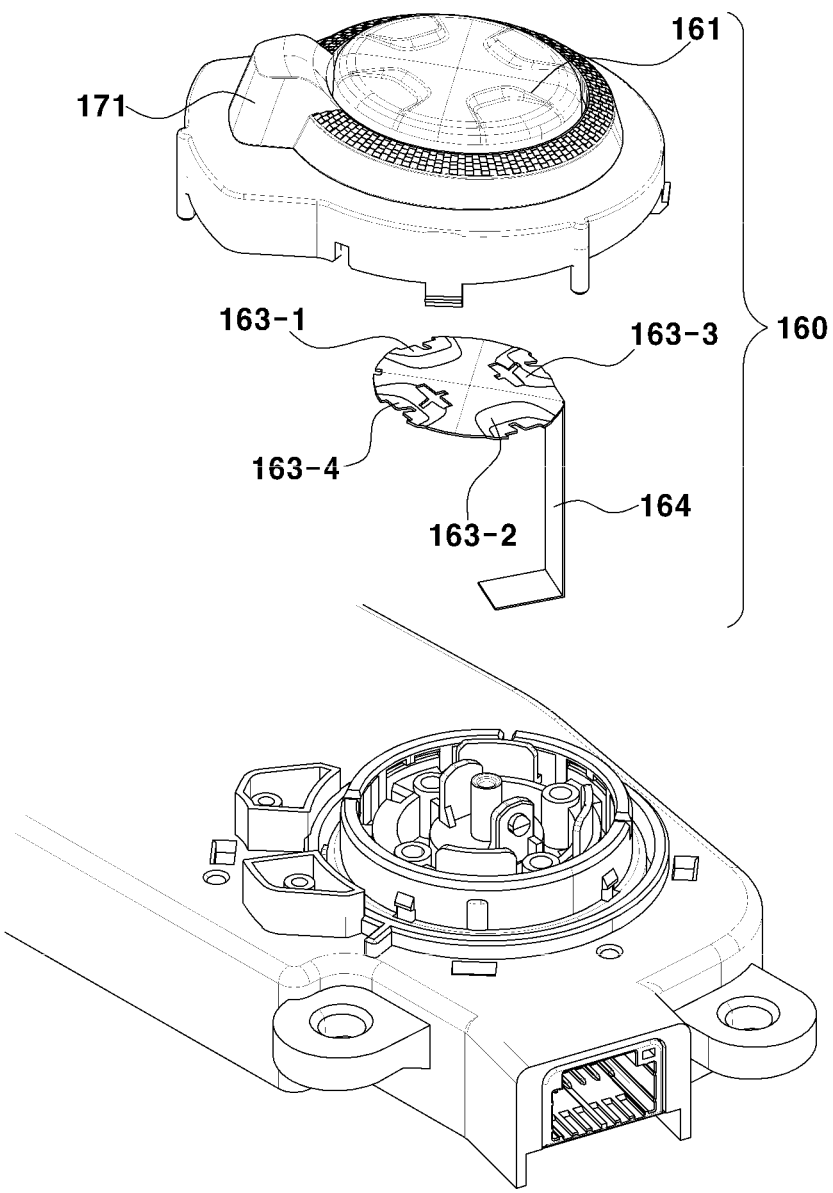
FIGS. 17 and 18 are perspective diagrams illustrating a sixth switch of the switch module according to one form of the present disclosure.
Figure 18:
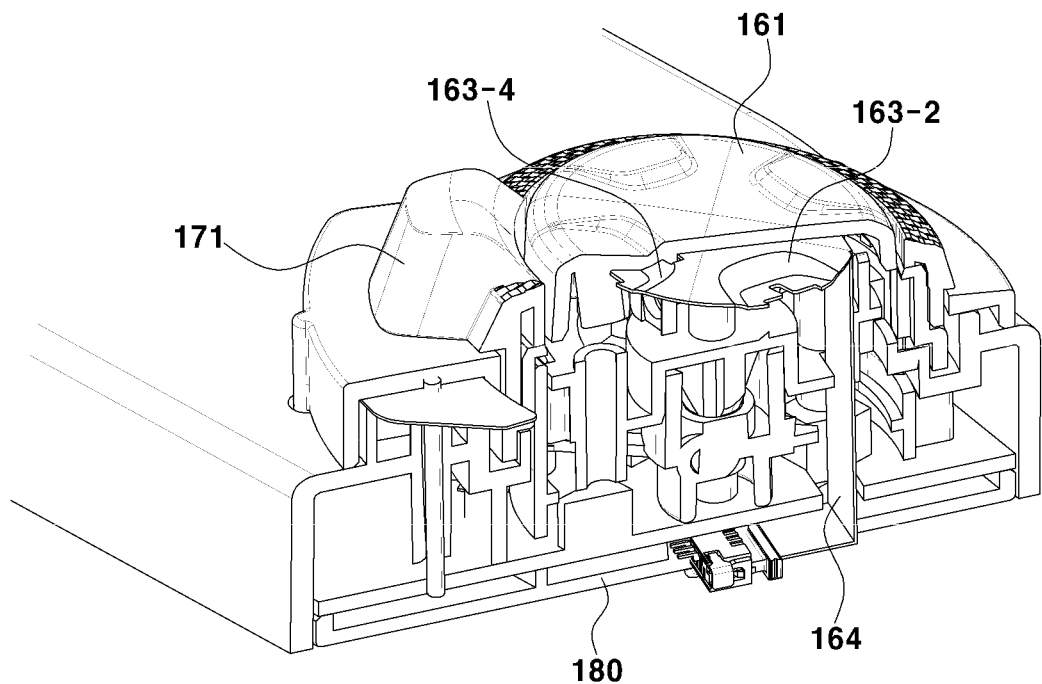

FIGS. 17 and 18 are diagrams illustrating a sixth switch of the switch module according to the present disclosure, and a reference numeral 160 indicates a push button type sixth switch.

The push button type sixth switch 160 is configured for operating the support direction adjustment operation of the lumbar support installed within the seatback, and includes a sixth switch cover 161 forming the appearance.

As illustrated in FIGS. 17 and 18, the sixth switch cover 161 is provided in a structure of being partitioned into a lumbar support forward protrusion operating region 161-1, a lumbar support backward contraction operating region 161-2, a lumbar support ascending operating region 161-3, and a lumbar support descending operating region 161-4.

Particularly, a 6-1st touch sensor 163-1 connected to the main controller 180 such that a signal may be output therefrom is embedded within the lumbar support forward protrusion operating region 161-1 of the sixth switch cover 161, and a 6-2nd touch sensor 163-2 connected to the main controller 180 such that a signal may be output therefrom is embedded within the lumbar support backward contraction operating region 161-2 of the sixth switch cover 161.

Further, a 6-3rd touch sensor 163-3 connected to the main controller 180 such that a signal may be output therefrom is embedded within the lumbar support ascending operating region 161-3 of the sixth switch cover 161, and a 6-4th touch sensor 163-4 connected to the main controller 180 such that a signal may be output therefrom is embedded within the lumbar support descending operating region 161-4 of the sixth switch cover 161.

At this time, an integrated signal output path of the 6-1st touch sensor 163-1, the 6-2nd touch sensor 163-2, the 6-3rd touch sensor 163-3, and the 6-4th touch sensor 163-4 is connected to the main controller 180 by a flexible cable 164 such that a signal may be transmitted.

Therefore, when the user's hand touches the lumbar support forward protrusion operating region 161-1 of the sixth switch cover 161, the sensing of the 6-1st touch sensor 163-1 configured in the lumbar support forward protrusion operating region 161-1 is performed, and the sensing signal of the 6-1st touch sensor 163-1 is output to the main controller 180 through the flexible cable 164.

Subsequently, the main controller 180 determines the operation direction of the power seat and the operation direction of the switch according to the sensing signal of the 6-1st touch sensor 163-1 as the lumbar support forward protrusion direction.

Figure 19A:
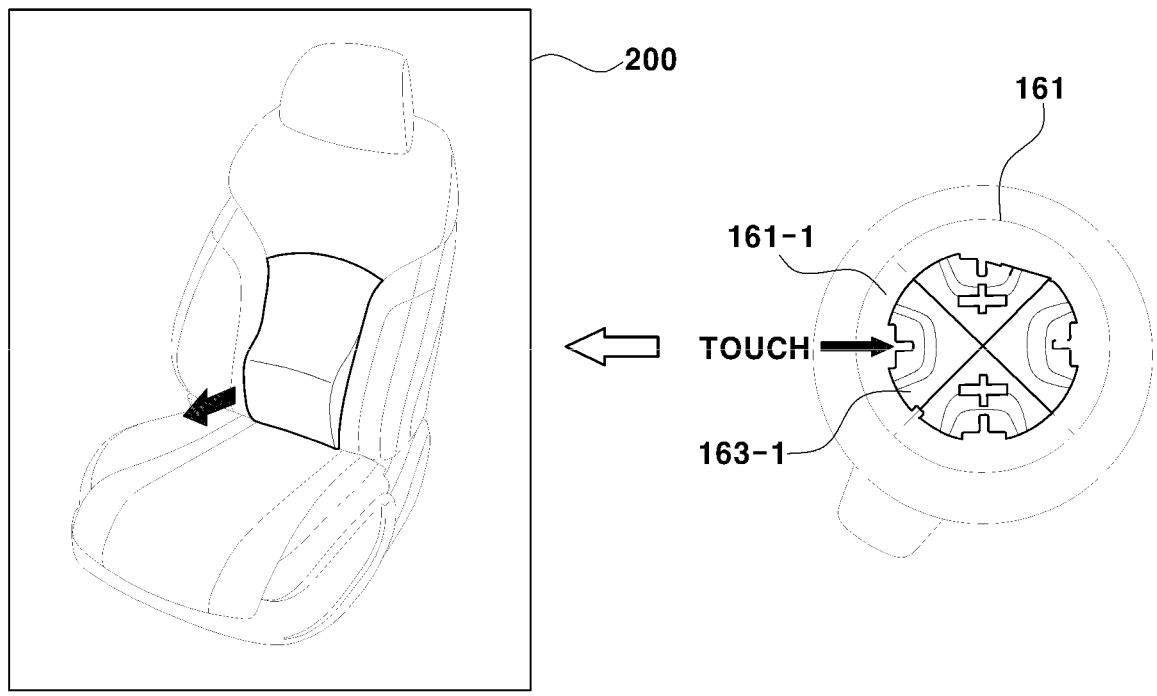
FIGS. 19A to 19D are diagrams illustrating that images guiding the operation direction of the power seat are differently displayed on a display according to the sensing of the touch sensor embedded in the sixth switch according to one form of the present disclosure.

Subsequently, the main controller 180 transmits a control signal instructing the display according to the signal determined as the lumbar support forward protrusion direction to the display 200, such that as illustrated in FIG. 19A, the seat image and one arrow image guiding the lumbar support forward protrusion operation direction may be displayed on the display 200.

Therefore, when watching the display 200, the user may easily recognize that the lumbar support is operated by protruding forward when currently pressing the sixth switch cover 161 in the state of touching the hand on the lumbar support forward protrusion operating region 161-1 of the sixth switch cover 161.

Alternatively, when the user's hand touches the lumbar support backward contraction operating region 161-2 of the sixth switch cover 161, the sensing of the 6-2nd touch sensor 163-2 therein is performed, and the sensing signal of the 6-2nd touch sensor 163-2 is output to the main controller 180 through the flexible cable 164.

Subsequently, the main controller 180 determines the operation direction of the power seat and the operation direction of the switch according to the sensing signal of the 6-2nd touch sensor 163-2 as the lumbar support backward contraction direction.

Figure 19B:
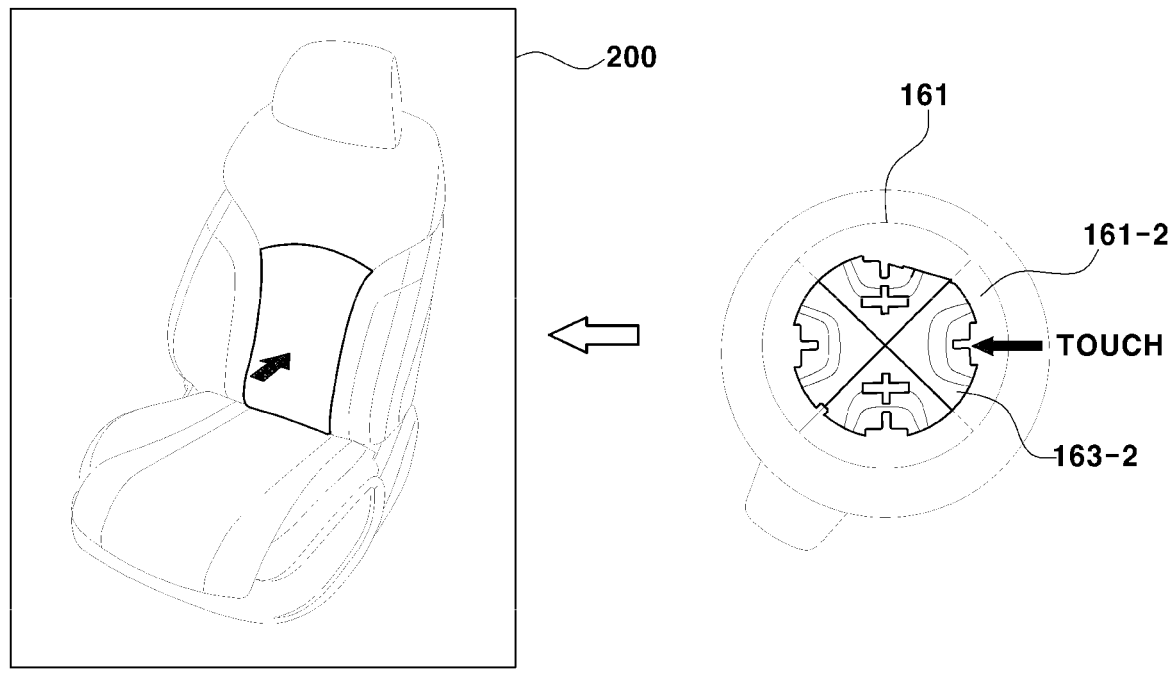

Subsequently, the main controller 180 transmits a control signal instructing the display according to the signal determined as the lumbar support backward contraction direction to the display 200, such that as illustrated in FIG. 19B, the seat image and one arrow image guiding the lumbar support backward contraction operation direction may be displayed on the display 200.

Therefore, when watching the display 200, the user may easily recognize that the lumbar support is operated by being contracted backward when currently pressing the sixth switch cover 161 in the state of touching the hand on the lumbar support backward contraction operating region 161-2 of the sixth switch cover 161.

Alternatively, when the user's hand touches the lumbar support ascending operating region 161-3 of the sixth switch cover 161, the sensing of the 6-3rd touch sensor 163-3 configured in the lumbar support ascending operating region 161-3 is performed, and the sensing signal of the 6-3rd touch sensor 163-3 is output to the main controller 180 through the flexible cable 164.

Subsequently, the main controller 180 determines the operation direction of the power seat and the operation direction of the switch according to the sensing signal of the 6-3rd touch sensor 163-3 as the lumbar support ascending direction.

Figure 19C:
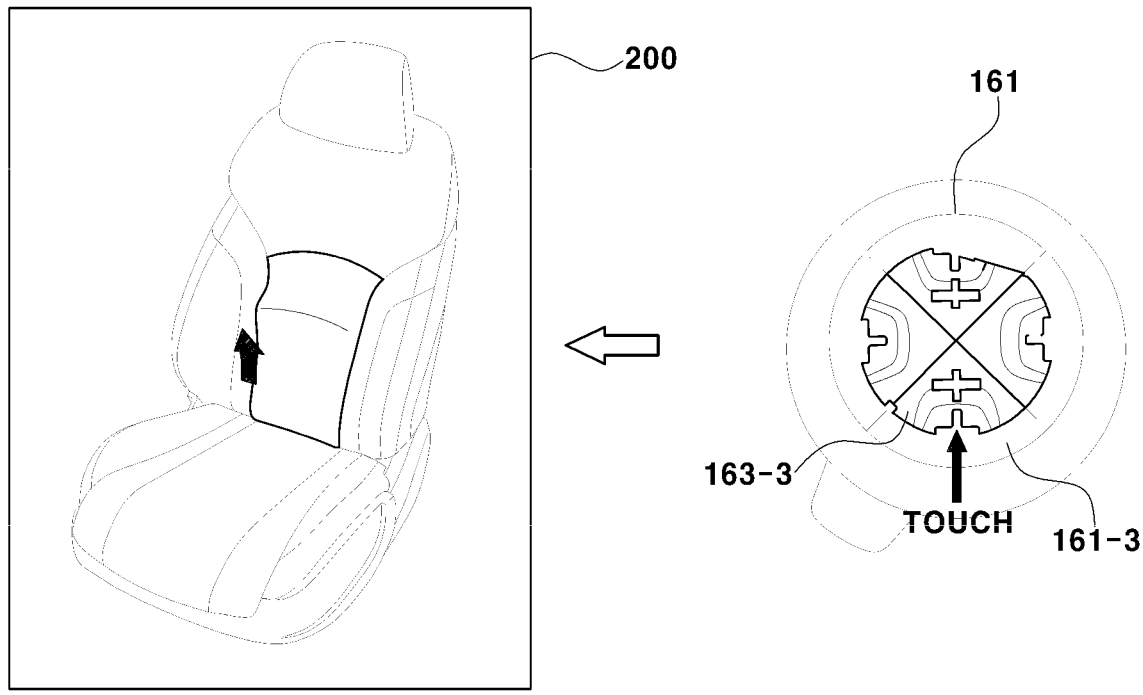

Subsequently, the main controller 180 transmits a control signal instructing the display according to the signal determined as the lumbar support ascending direction to the display 200, such that as illustrated in FIG. 19C, the seat image and one arrow image guiding the lumbar support ascending operation direction may be displayed on the display 200.

Therefore, when watching the display 200, the user may easily recognize that the lumbar support is operated by moving upward when currently pressing the sixth switch cover 161 in the state of touching the hand on the lumbar support ascending operating region 161-3 of the sixth switch cover 161.

Alternatively, when the user touches the lumbar support descending operating region 161-4 of the sixth switch cover 161, the sensing of the 6-4th touch sensor 163-4 configured in the lumbar support descending operating region 161-4 is performed, and the sensing signal of the 6-4th touch sensor 163-4 is output to the main controller 180 through the flexible cable 164.

Subsequently, the main controller 180 determines the operation direction of the power seat and the operation direction of the switch according to the sensing signal of the 6-4th touch sensor 163-4 as the lumbar support descending direction.

Figure 19D:
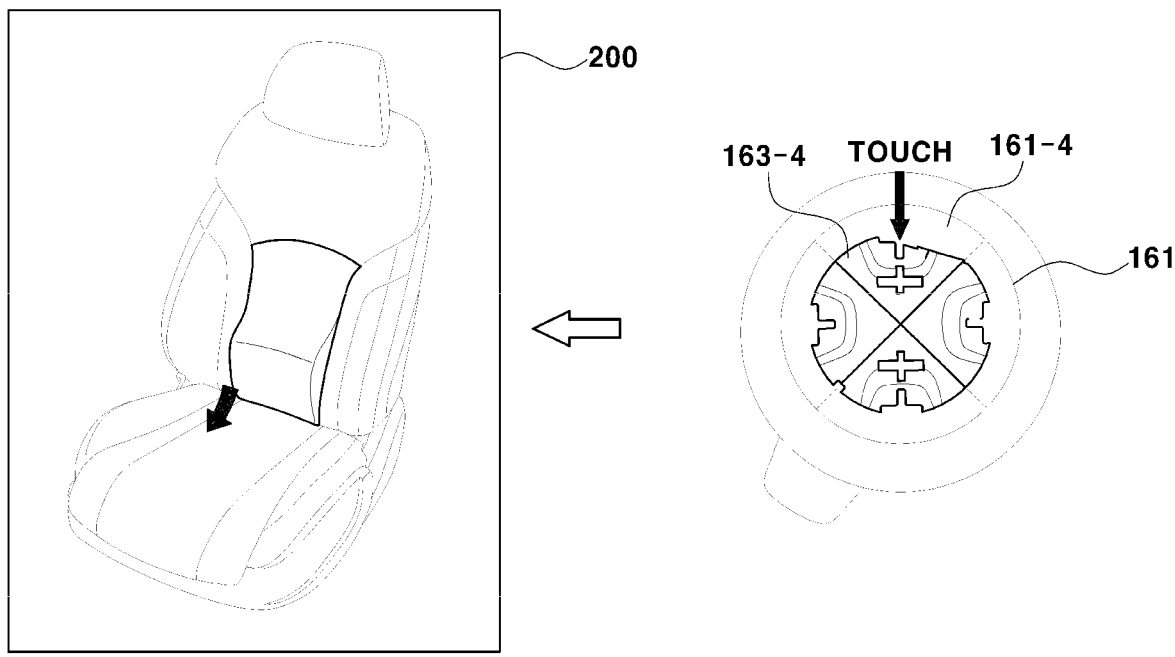

Subsequently, the main controller 180 transmits a control signal instructing the display according to the signal determined as the lumbar support descending direction to the display 200, such that as illustrated in FIG. 19D, the seat image and one arrow image guiding the lumbar support descending operation direction may be displayed on the display 200.

Therefore, when watching the display 200, the user may easily recognize that the lumbar support is operated by moving downward when currently pressing the sixth switch cover 161 in the state of touching the hand on the lumbar support descending operating region 161-4 of the sixth switch cover 161.

Figure 20:
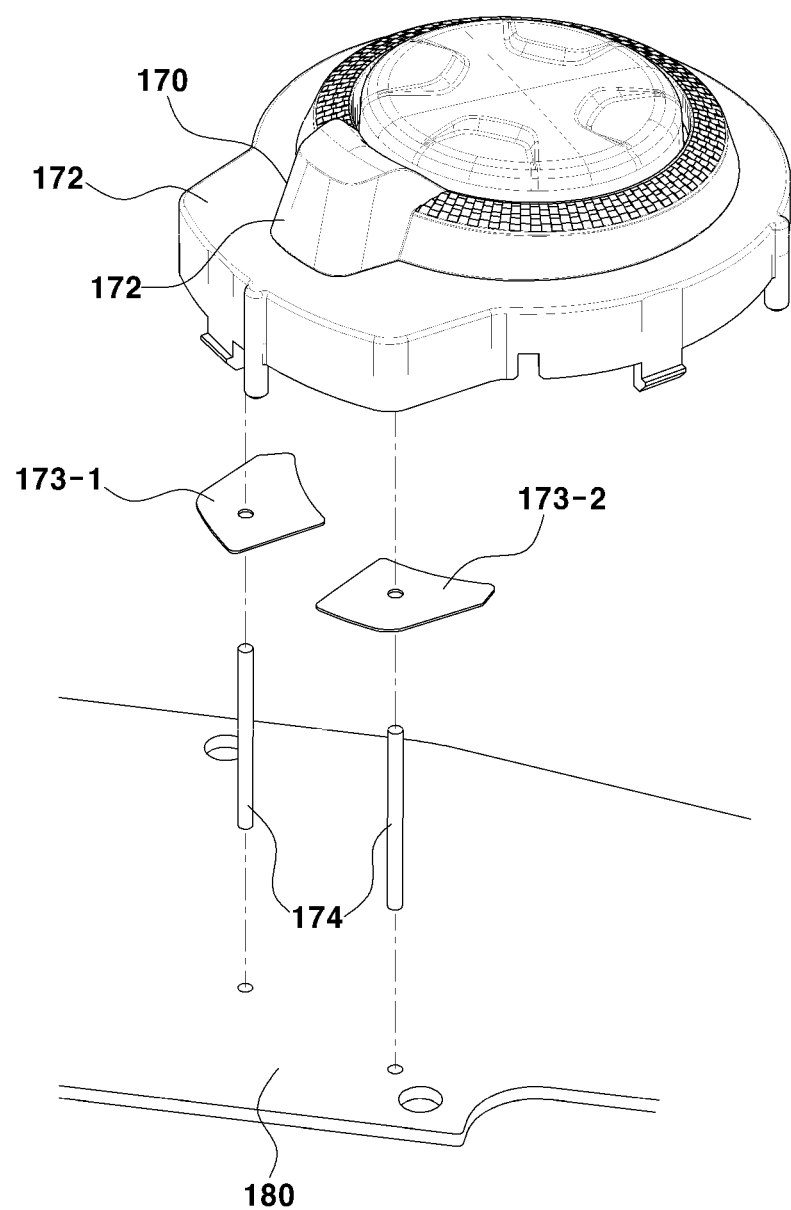
FIGS. 20 and 21 are perspective diagrams illustrating a seventh switch of the switch module according to one form of the present disclosure.
Figure 21:
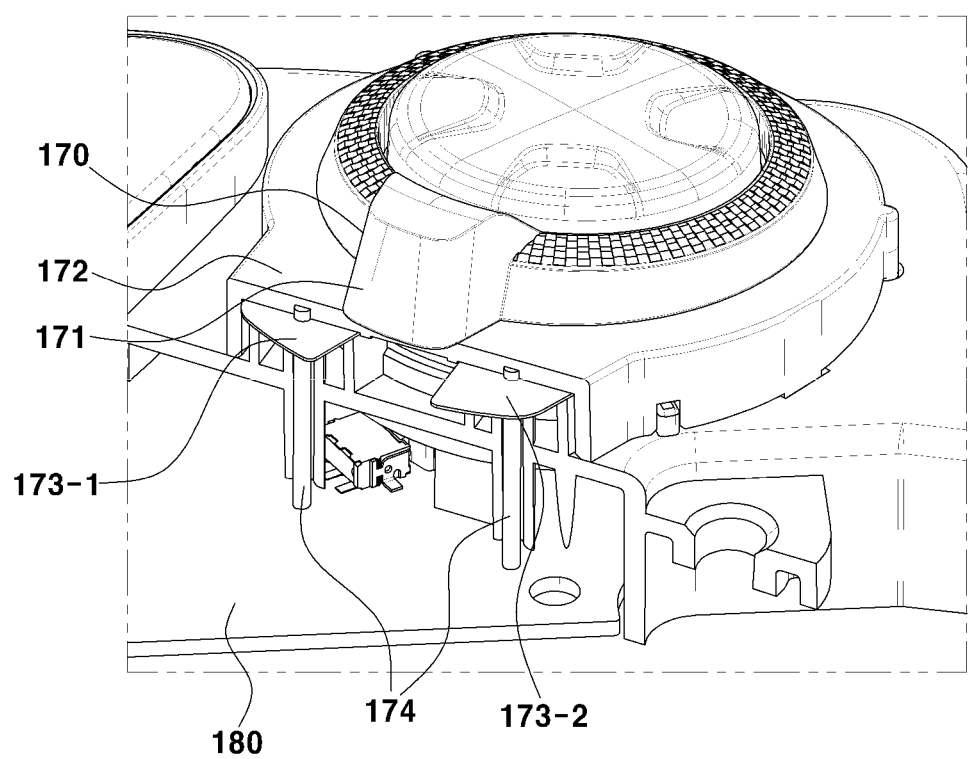

FIGS. 20 and 21 are diagrams illustrating a seventh switch of the switch module according to the present disclosure, and a reference numeral 170 indicates a rotary knob type seventh switch.

The rotary knob type seventh switch 170 is configured for operating the bolster angle adjustment operation of the seatback, and as illustrated in FIGS. 20 and 21, includes a seventh switch cover 171 which may be arranged on the outer circumferential location of the fourth switch cover 141 such that the angular rotation is possible.

Particularly, as illustrated in FIG. 20, a 7-1st touch sensor 173-1 is embedded in a garnish plate 172 adjacent to one side surface of the seventh switch cover 171, and a 7-2nd touch sensor 173-2 is embedded in the garnish plate 172 adjacent to the other side surface of the seventh switch cover 171.

At this time, the 7-1st touch sensor 173-1 and the 7-2nd touch sensor 173-2 are connected to the main controller 180 by a conductive spring 174, a conductive pin, or the like such that a signal may be output.

Therefore, when the user's hand touches the garnish plate 172 on one side of the seventh switch cover 171, the sensing of the 7-1st touch sensor 173-1 configured in the garnish plate 172 is performed, and the sensing signal of the 7-1st touch sensor 173-1 is output to the main controller 180 through the conductive spring 174.

Subsequently, the main controller 180 determines the operation direction of the power seat and the operation direction of the switch according to the sensing signal of the 7-1st touch sensor 173-1 as the bolster inward movement direction.

Subsequently, the main controller 180 transmits a control signal instructing the display according to the signal determined as the bolster inward movement direction to the display 200, such that as illustrated in FIG. 22A, the seat image and an arrow image guiding the bolster inward movement operation direction may be displayed on the display 200.

Therefore, when watching the display 200, the user may easily recognize that the bolster may be adjusted to move inward when currently rotating the display 200 toward one side of the seventh switch cover 171.

On the other hand, when the user's hand touches the garnish plate 172 on the other side of the seventh switch cover 171, the sensing of the 7-2nd touch sensor 173-2 configured in the garnish plate 172 is performed, and the sensing signal of the 7-2nd touch sensor 173-2 is output to the main controller 180 through the conductive spring 174.

Subsequently, the main controller 180 determines the operation direction of the power seat and the operation direction of the switch according to the sensing signal of the 7-2nd touch sensor 173-2 as the bolster outward movement direction.

Subsequently, the main controller 180 transmits a control signal instructing the display according to the signal determined as the bolster outward movement direction to the display 200, such that as illustrated in FIG. 22B, the seat image and an arrow image guiding the bolster outward movement operation direction may be displayed on the display 200.

Therefore, when watching the display 200, the user may easily recognize that the bolster may be adjusted to move outward when currently rotating the bolster toward the other side of the seventh switch cover 171.

Meanwhile, if the user's hand touches two or more touch sensors and two or more touch sensors simultaneously perform the sensing operation, two or more arrows guiding the operation direction of the power seat and the operation direction of the switch may be displayed on the display 200.

As described above, the user may accurately recognize the current switch selection state and switch operation direction, and the operation direction of the power seat according to the switch operating while watching the seat and arrow images displayed on the display 200, thereby improving the switch handing convenience of the user.

What is claimed is:

1. A power seat operating device for a vehicle, the power seat operating device comprising:
   a switch module including a plurality of seesaw type switches, and configured to adjust a power seat to a desired position in a desired direction;
   a plurality of touch sensors embedded in each seesaw type switch of the plurality of seesaw type switches, and configured to each generate a sensing signal corresponding to an operation direction of the power seat when touched by a user;
   a main controller configured to determine the operation direction of the power seat, based on the sensing signals of the plurality of touch sensors; and
   a display configured to display an arrow visually informing the user of the operation direction of the power seat,
   wherein the plurality of seesaw type switches includes:
      a first seesaw type switch configured to operate a forward and backward movement operation of the power seat,
      a second seesaw type switch configured to operate a vertical height adjustment operation of the power seat,
      a third seesaw type switch configured to operate a front portion up and down operation of a seat cushion of the power seat,
      a fourth seesaw type switch configured to operate an extension operation for the front portion of the seat cushion, and
      a fifth seesaw type switch configured to operate a reclining operation of a seatback of the power seat, and
   wherein the switch module further includes:

a sixth push button type switch configured to operate a support direction adjustment operation of a lumbar support of the power seat, and
a seventh rotary knob type switch configured to operate a bolster angle adjustment operation of the seatback.

2. The power seat operating device of claim 1, wherein the first seesaw type switch comprises:
a first switch cover;
a 1-1st touch sensor and a 1-2nd touch sensor spaced apart from each other and attached to a bottom surface portion of the first switch cover;
a first moving block mounted on the bottom surface portion of the first switch cover;
a 1-1st plunger and a 1-2nd plunger connected to bottom portions of both sides of the first moving block to press a tact switch mounted on the main controller;
a 1-1st conductive spring connecting between the 1-1st touch sensor and the main controller; and
a 1-2nd conductive spring connecting between the 1-2nd touch sensor and the main controller.

3. The power seat operating device of claim 2, wherein:
side ends of the first switch cover are formed with a 1-1st electrode exposure hole and a 1-2nd electrode exposure hole, respectively,
a 1-1st electrode inserted into the 1-1st electrode exposure hole and exposed to outside is formed to protrude from the 1-1st touch sensor, and
a 1-2nd electrode inserted into the 1-2nd electrode exposure hole and exposed to the outside is formed to protrude from the 1-2nd touch sensor.

4. The power seat operating device of claim 1, wherein the second seesaw type switch comprises:
a second switch cover;
a 2-1st touch sensor and a 2-2nd touch sensor spaced apart from each other and attached to a bottom surface portion of the second switch cover;
a second moving block mounted on the bottom surface portion of the second switch cover;
a 2-1st plunger and a 2-2nd plunger connected to bottom portions of both sides of the second moving block to press a tact switch mounted on the main controller;
a 2-1st conductive spring connecting between the 2-1st touch sensor and the main controller; and
a 2-2nd conductive spring connecting between the 2-2nd touch sensor and the main controller.

5. The power seat operating device of claim 4, wherein:
side ends of the second switch cover are formed with a 2-1st electrode exposure hole and a 2-2nd electrode exposure hole, respectively,
a 2-1st electrode inserted into the 2-1st electrode exposure hole and exposed to the outside is formed to protrude from the 2-1st touch sensor, and
a 2-2nd electrode inserted into the 2-2nd electrode exposure hole and exposed to the outside is formed to protrude from the 2-2nd touch sensor.

6. The power seat operating device of claim 1, wherein the third seesaw type switch comprises:
a third switch cover;
a 3-1st touch sensor and a 3-2nd touch sensor spaced apart from each other and attached to a bottom surface portion of the third switch cover;
a third moving block mounted on the bottom surface portion of the third switch cover;
a 3-1st plunger and a 3-2nd plunger connected to bottom portions of both sides of the third moving block to press a tact switch mounted on the main controller;
a 3-1st conductive spring connecting between the 3-1st touch sensor and the main controller; and
a 3-2nd conductive spring connecting between the 3-2nd touch sensor and the main controller.

7. The power seat operating device of claim 6, wherein:
side ends of the third switch cover are formed with a 3-1st electrode exposure hole and a 3-2nd electrode exposure hole, respectively,
a 3-1st electrode inserted into the 3-1st electrode exposure hole and exposed to outside is formed to protrude from the 3-1st touch sensor, and
a 3-2nd electrode inserted into the 3-2nd electrode exposure hole and exposed to the outside is formed to protrude from the 3-2nd touch sensor.

8. The power seat operating device of claim 1, wherein the fourth seesaw type switch comprises:
a fourth switch cover;
a 4-1st touch sensor and a 4-2nd touch sensor spaced apart from each other and attached to a bottom surface portion of the fourth switch cover;
a fourth moving block mounted on the bottom surface portion of the fourth switch cover;
a 4-1st plunger and a 4-2nd plunger connected to bottom portions of both sides of the fourth moving block to press a tact switch mounted on the main controller;
a 4-1st conductive spring connecting between the 4-1st touch sensor and the main controller; and
a 4-2nd conductive spring connecting between the 4-2nd touch sensor and the main controller.

9. The power seat operating device of claim 8, wherein:
side ends of the fourth switch cover are formed with a 4-1st electrode exposure hole and a 4-2nd electrode exposure hole, respectively,
a 4-1st electrode inserted into the 4-1st electrode exposure hole and exposed to outside is formed to protrude from the 4-1st touch sensor, and
a 4-2nd electrode inserted into the 4-2nd electrode exposure hole and exposed to the outside is formed to protrude from the 4-2nd touch sensor.

10. The power seat operating device of claim 1, wherein the fifth seesaw type switch comprises:
a fifth switch cover;
a 5-1st touch sensor and a 5-2nd touch sensor spaced apart from each other and attached to a bottom surface portion of the fifth switch cover;
a fifth moving block mounted on the bottom surface portion of the fifth switch cover;
a 5-1st plunger and a 5-2nd plunger connected to bottom portions of both sides of the fifth moving block to press a tact switch mounted on the main controller;
a 5-1st conductive spring connecting between the 5-1st touch sensor and the main controller; and
a 5-2nd conductive spring connecting between the 5-2nd touch sensor and the main controller.

11. The power seat operating device of claim 10, wherein:
side ends of the fifth switch cover are formed with a 5-1st electrode exposure hole and a 5-2nd electrode exposure hole, respectively,
a 5-1st electrode inserted into the 5-1st electrode exposure hole and exposed to outside is formed to protrude from the 5-1st touch sensor, and
a 5-2nd electrode inserted into the 5-2nd electrode exposure hole and exposed to the outside is formed to protrude from the 5-2nd touch sensor.

12. The power seat operating device of claim 1, wherein the sixth push button type switch comprises:

a sixth switch cover partitioned into a forward protrusion operating region of the lumbar support, a backward contraction operating region thereof, an ascending operating region thereof, and a descending operating region thereof;

a 6-1st touch sensor embedded in the forward protrusion operating region of the lumbar support of the sixth switch cover and connected to the main controller such that a signal is output;

a 6-2nd touch sensor embedded in the backward contraction operating region of the lumbar support of the sixth switch cover and connected to the main controller such that a signal is output;

a 6-3rd touch sensor embedded in the ascending operating region of the lumbar support of the sixth switch cover and connected to the main controller such that a signal is output; and a 6-4th touch sensor embedded in the descending operating region of the lumbar support of the sixth switch cover and connected to the main controller such that a signal is output.

13. The power seat operating device of claim 12, further comprising:

a flexible cable connected to the main controller and configured to function as a common signal output path shared by the 6-1st touch sensor, the 6-2nd touch sensor, the 6-3rd touch sensor, and the 6-4th touch sensor, thereby transmitting a signal.

14. The power seat operating device of claim 1, wherein the seventh rotary knob type switch comprises:

a seventh switch cover mounted on a predetermined location of a circumferential portion of the sixth push button type switch;

a 7-1st touch sensor embedded in a garnish plate adjacent to a first side surface of the seventh switch cover and connected to the main controller such that a signal is output; and a 7-2nd touch sensor embedded in the garnish plate adjacent to a second side surface of the seventh switch cover and connected to the main controller such that a signal is output.

15. The power seat operating device of claim 14, wherein the 7-1st touch sensor and the 7-2nd touch sensor are connected to the main controller by a conductive spring such that a signal is transmitted.

* * * * *